United States Patent [19]
Lee

[11] Patent Number: 5,862,598
[45] Date of Patent: *Jan. 26, 1999

[54] UNITARY HUB FOR VEGETATION CUTTING DEVICES

[76] Inventor: Anthony L. Lee, P.O. Box 617, Walnut Grove, Calif. 95690

[*] Notice: This patent issued on a continued prosecution application filed under 37 CFR 1.53(d), and is subject to the twenty year patent term provisions of 35 U.S.C. 154(a)(2).

The term of this patent shall not extend beyond the expiration date of Pat. No. 5,430,943.

[21] Appl. No.: 658,564

[22] Filed: Jun. 5, 1996

Related U.S. Application Data

[60] Continuation of Ser. No. 484,684, Jun. 7, 1995, abandoned, which is a division of Ser. No. 161,715, Dec. 3, 1993, Pat. No. 5,430,943, which is a continuation-in-part of Ser. No. 990,792, Dec. 10, 1992, abandoned.

[51] Int. Cl.$^6$ ...................................................... A01D 55/18
[52] U.S. Cl. .................................. 30/276; 30/300; 30/347
[58] Field of Search ................................... 30/276, 277.4, 30/347, 300; 56/12.7; D8/8

[56] References Cited

U.S. PATENT DOCUMENTS

| | | |
|---|---|---|
| 280,903 | 10/1883 | Barbula . |
| 299,484 | 1/1884 | Lee . |
| 2,382,292 | 8/1945 | Carlson et al. . |
| 2,434,538 | 1/1948 | Wurzburger . |
| 3,104,510 | 9/1963 | Voigt . |
| 3,185,613 | 5/1965 | Adams . |
| 3,272,901 | 9/1966 | Sims . |
| 3,283,488 | 11/1966 | Franklin ..................................... 30/347 |
| 3,388,198 | 6/1968 | Sims . |
| 3,393,083 | 7/1968 | Go . |
| 3,402,524 | 9/1968 | Griner . |
| 3,474,608 | 10/1969 | Frick . |
| 3,567,569 | 3/1971 | Ono et al. . |
| 3,671,381 | 6/1972 | Hansen . |
| 3,826,068 | 7/1974 | Ballas et al. . |
| 3,831,278 | 8/1974 | Voglesonger . |
| 3,859,776 | 1/1975 | Ballas et al. . |
| 3,877,146 | 4/1975 | Pittinger . |
| 4,047,299 | 9/1977 | Bair . |
| 4,054,993 | 10/1977 | Kamp et al. . |
| 4,086,700 | 5/1978 | Inkda ........................................ 30/347 |
| 4,107,841 | 8/1978 | Rebbun . |
| 4,118,865 | 10/1978 | Jacyno et al. . |

(List continued on next page.)

Primary Examiner—Kenneth E. Peterson
Attorney, Agent, or Firm—Flehr Hohbach Test Albritton & Herbert LLP

[57] ABSTRACT

A cutting attachment for use with a vegetation cutting device. The cutting attachment has a body with a generally planar coupling portion and a central axis of rotation. In one embodiment, the body further includes a conical central wall portion extending radially outwardly and in a first direction from the coupling portion and the axis and a circular outer wall portion adjoining the central wall portion and extending generally radially outwardly therefrom. The central wall portion defines a conically-shaped self-cleaning inner cavity disposed symmetrically about the axis. The outer wall portion has a generally smooth outer surface which serves as a skid plate. An outer self-cleaning cavity is formed by an outer surface of the central wall portion and an inner surface of the outer wall portion. A coupling assembly, which can include an adapter having first and second clamping elements, is carried by the coupling portion for coupling the body to the cutting device to cause rotation about the axis. A plurality of spaced apart radially extending cutting elements, in the form of cutting blades and/or cutting strings, are carried by the body. Cutting blades are provided with aerodynamic configurations, serrated edges, inner and outer cutting edges and arms for securing the blades to the cutting attachment which permit longitudinal movement of the cutting blade with respect to the cutting attachment. Cutting strings are provided with inner and outer cutting portions, grooves for reducing fraying and a spiraled configuration.

24 Claims, 9 Drawing Sheets

U.S. PATENT DOCUMENTS

| | | |
|---|---|---|
| 4,126,990 | 11/1978 | Fisher et al. . |
| 4,126,991 | 11/1978 | Gobin et al. . |
| 4,186,239 | 1/1980 | Mize et al. . |
| 4,202,094 | 5/1980 | Kalmar ................ 30/276 |
| 4,249,311 | 2/1981 | Inaga . |
| 4,265,018 | 5/1981 | Schrock et al. ............ 30/276 |
| 4,310,970 | 1/1982 | Evenson et al. . |
| 4,356,686 | 11/1982 | Lessiq, III . |
| 4,406,065 | 9/1983 | Kohler .................. 30/347 |
| 4,571,831 | 2/1986 | White, III ............. 30/276 |
| 4,584,240 | 4/1986 | Herbert et al. . |
| 4,756,146 | 7/1988 | Rouse ................... 30/276 |
| 4,790,071 | 12/1988 | Helmig et al. ........... 30/276 |
| 4,817,288 | 4/1989 | Hirose et al. ........... 30/347 |
| 4,856,194 | 8/1989 | Lee ..................... 30/276 |
| 4,869,055 | 9/1989 | Mickelson .............. 56/12.7 |
| 5,020,224 | 6/1991 | Haupt .................. 30/347 |
| 5,048,278 | 9/1991 | Jones et al. ............ 56/295 |
| 5,220,774 | 6/1993 | Harbeke et al. . |
| 5,303,476 | 4/1994 | Tuggle ................. 30/276 |
| 5,617,636 | 4/1997 | Taggett et al. ......... 30/276 |

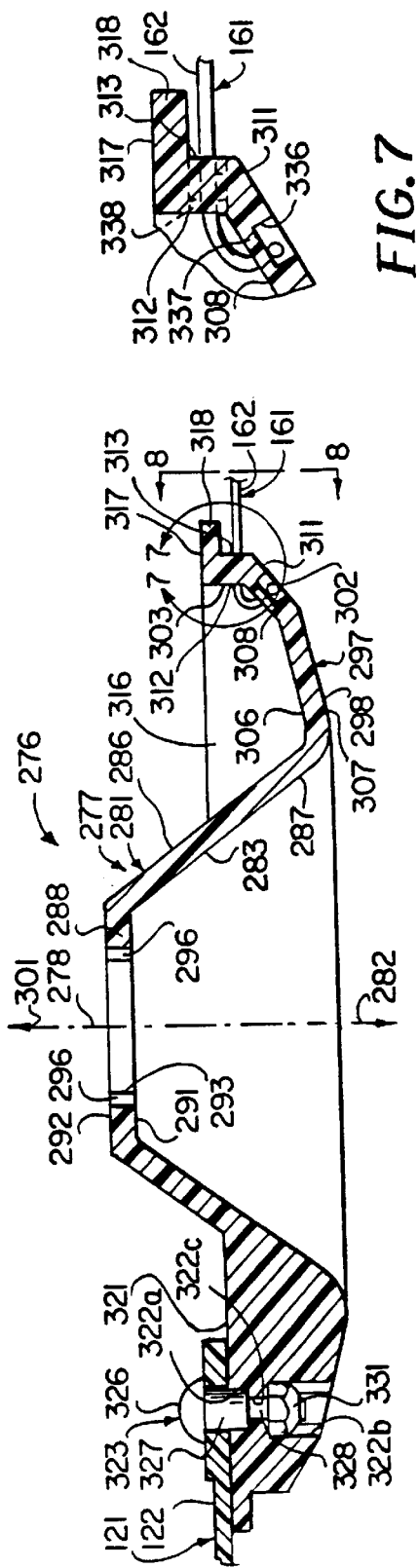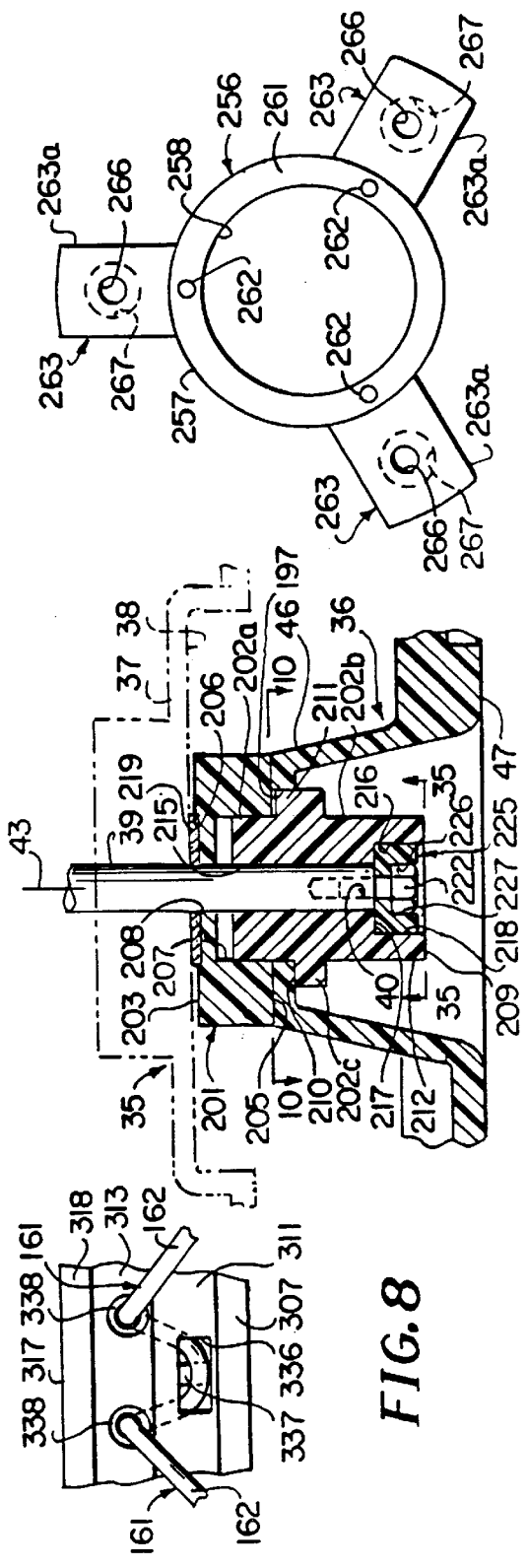

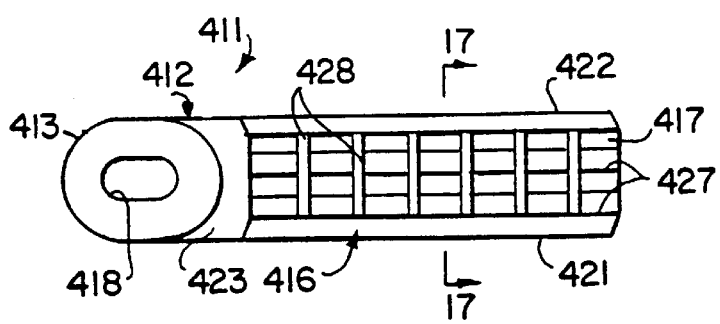
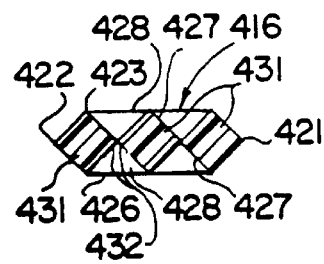
FIG. 16
FIG. 17
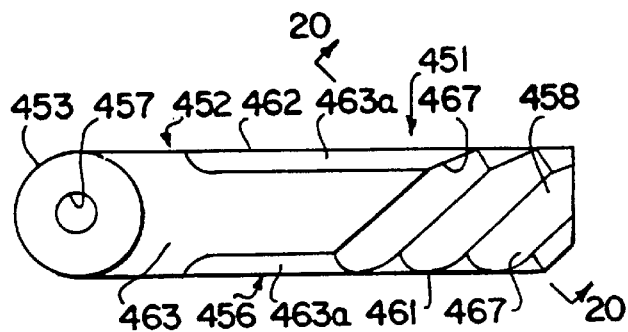
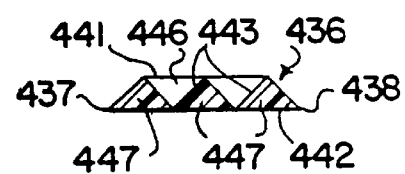
FIG. 19
FIG. 18
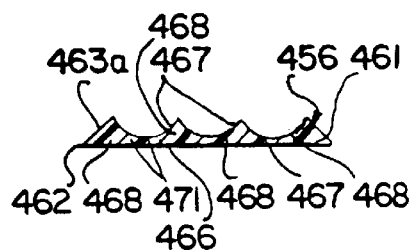
FIG. 20
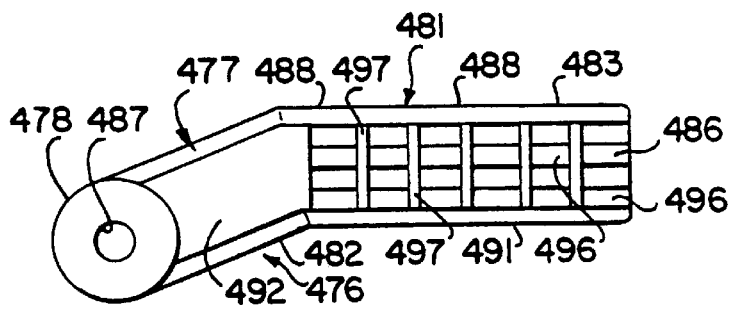
FIG. 21

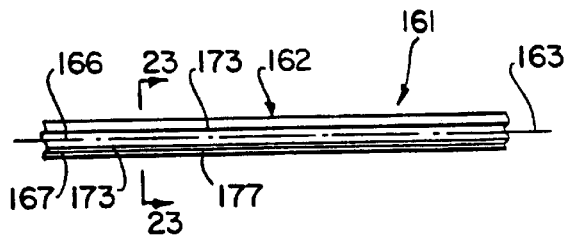
FIG. 22
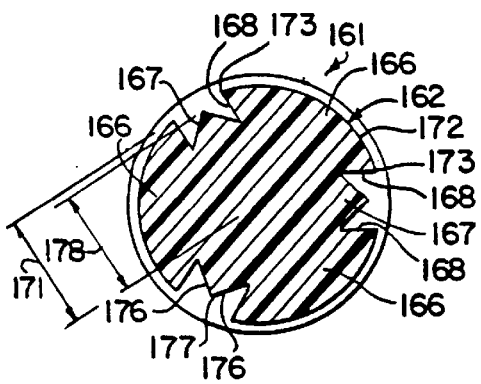
FIG. 23
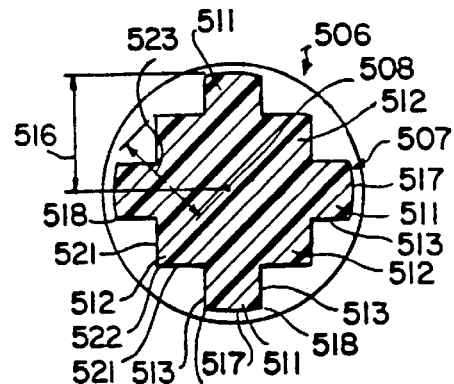
FIG. 24
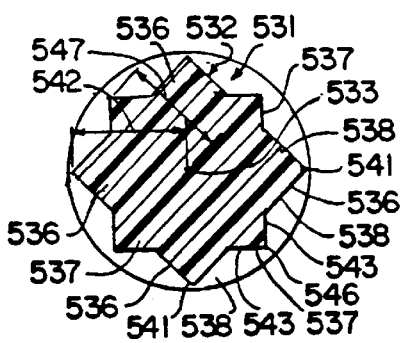
FIG. 25
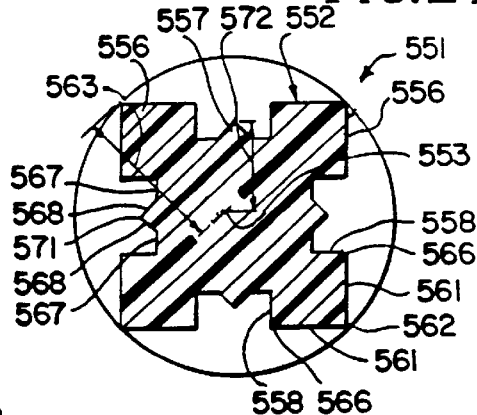
FIG. 26
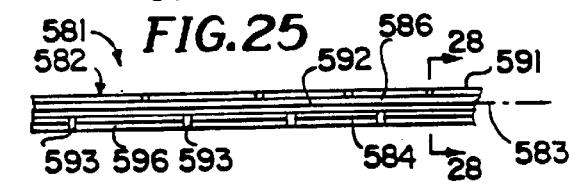
FIG. 27
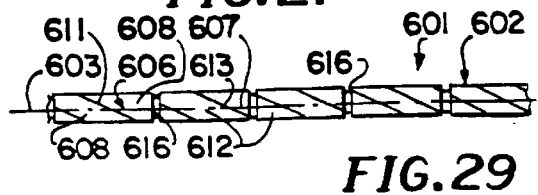
FIG. 29
FIG. 28

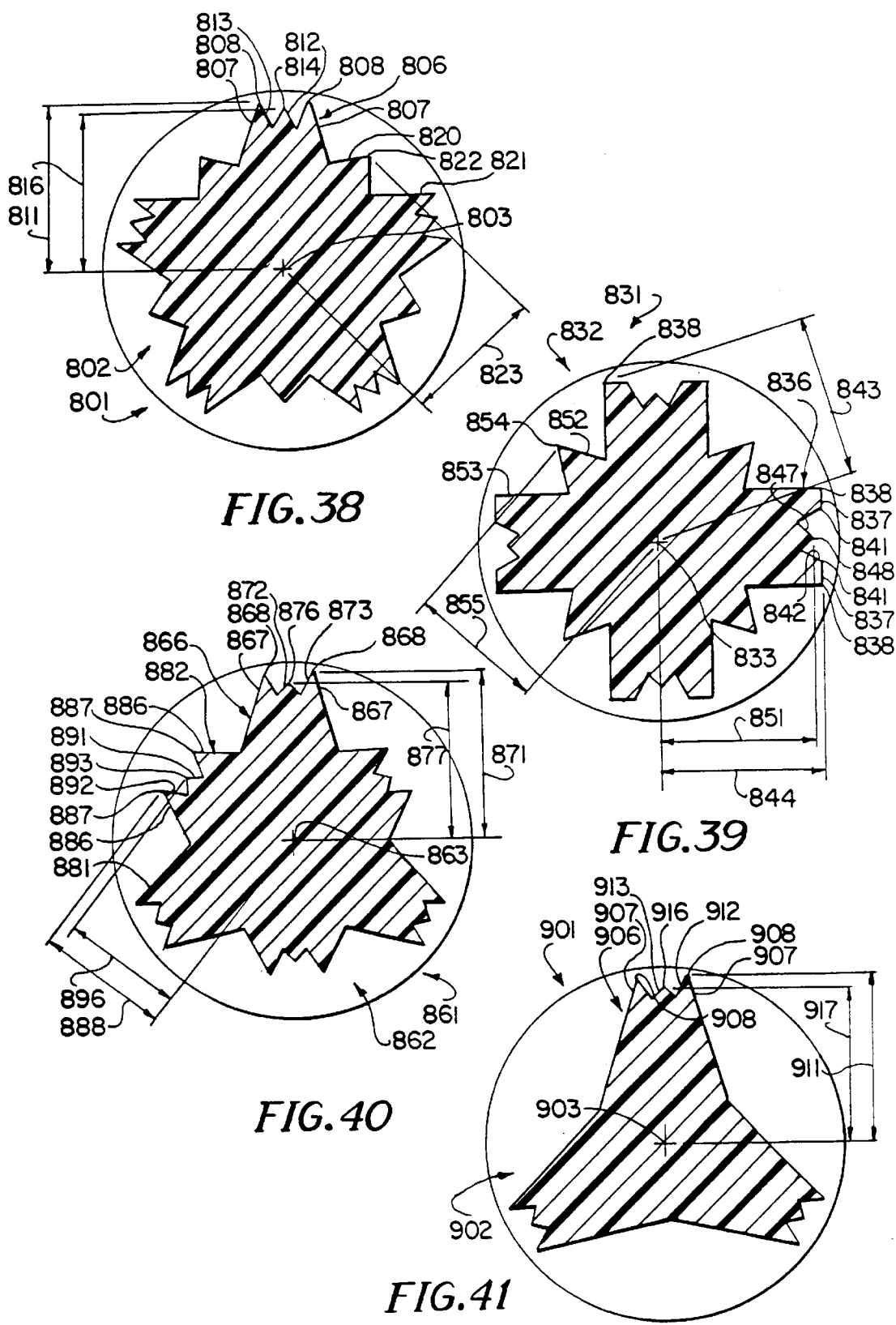

UNITARY HUB FOR VEGETATION CUTTING DEVICES

This is a continuation of U.S. patent application Ser. No. 08/484,684 filed Jun. 7, 1995, now abandonded, which is a division of U.S. patent application Ser. No. 08/161,715 filed Dec. 3, 1993, now U.S. Pat. No. 5,430,943, which is a continuation-in-part of U.S. patent application Ser. No. 07/990,792 filed Dec. 10, 1992, abandoned.

This invention relates to vegetation cutting devices, and more particularly to cutting attachments for use therewith.

Numerous cutting attachments have been provided for rotatably mounting to vegetation cutting and trimming devices. Most of these cutting attachments, however, are not formed with skid plates which limit snagging during use. In addition, many of these cutting attachments are not self-cleaning and, as a result, collect debris during operation. Accumulated debris can limit the efficiency of the trimming device. Other cutting attachments are formed with skid plates and/or are configured so as to be self-cleaning, but have bodies formed from more than one section (See U.S. Pat. No. 4,856,194). Each section of a cutting attachment generally adds to the cost of manufacture and multisectioned attachments require additional parts for assembly. Cutting attachments currently provided are also usually not interchangeable between cutting devices made by various manufacturers.

Numerous cutting lines and strings and other accessories have also been provided for such cutting attachments. In general, these cutting accessories have a number of disadvantages. Many such cutting blades and strings dull from use and become ineffective. Most such blades are easily damaged if they encounter hard objects during use, particularly if rigidly attached to the cutting attachment. These blades are also generally ineffectual for cutting certain vegetation. Cutting strings currently available are also susceptible to fraying, which can reduce the cutting ability of the string. Cutting strings with protruding edges have also been found to cause significant wear to the cutting attachment, often forming sharp edges therein which can undesirably sever the cutting string.

In general, it is an object of the present invention to provide a cutting attachment which overcomes the limitations and disadvantages of the cutting attachments currently provided.

Another object of the invention is to provide a cutting attachment of the above character which has a unitary lightweight body.

Another object of the invention is to provide a cutting attachment of the above character which has a self-cleaning shape.

Another object of the invention is to provide a cutting attachment of the above character in which any cavities therein are formed from generally smooth and outwardly inclined surfaces to inhibit weeds from becoming caught in the same.

Another object of the invention is to provide a cutting attachment of the above character having a skid plate.

Another object of the invention is to provide a cutting attachment of the above character having an upper cavity and an accessory in the form of a cover plate which can be mounted on the body to overlie the upper cavity.

Another object of the invention is to provide a cutting attachment of the above character which can be readily coupled to various types of cutting devices.

Another object of the invention is to provide a cutting attachment of the above character having improved cutting elements.

Another object of the invention is to provide a cutting attachment of the above character in which the cutting elements include a cutting blade having an inner cutting edge which can be exposed for use after the outermost leading cutting edge has worn.

Another object of the invention is to provide a cutting attachment of the above character in which the cutting blades have serrated cutting edges.

Another object of the invention is to provide a cutting attachment of the above character in which the cutting blades are aerodynamic in design.

Another object of the invention is to provide a cutting attachment of the above character in which the cutting blades are yieldably mounted to the cutting attachment for movement upon contact with an object.

Another object of the invention is to provide a cutting attachment of the above character in which the cutting elements include a cutting string having an inner cutting edge which can be exposed after the outermost cutting edge has worn.

Another object of the invention is to provide a cutting attachment of the above character in which the cutting strings do not cause significant wear to the cutting attachment during use thereof.

Another object of the invention is to provide a cutting attachment of the above character in which the cutting strings inhibit fraying thereof.

Another object of the invention is to provide a cutting attachment of the above character in which the cutting strings have cutting edges which are aerodynamically spiraled in longitudinal configuration.

Another object of the invention is to provide a cutting attachment of the above character which is provided with cutting elements in the form of cutting blades and cutting strings.

These and other objects are achieved in accordance with the invention by providing a cutting attachment for use with a vegetation cutting device having a rotatable drive member. The cutting attachment has a body with a generally planar coupling portion and a central axis of rotation.

In one embodiment, the body further includes a conical central wall portion extending outwardly and in a first direction from the coupling portion and with respect to the axis of rotation and a circular outer wall portion adjoining the central wall portion and extending generally radially outwardly from the axis of rotation. The central wall portion has a generally smooth inner surface which forms a conically-shaped first cavity disposed symmetrically about the axis of rotation. This cavity opens outwardly in the first direction so that it is self-cleaning during operation of the cutting device. The outer wall portion has a generally smooth outer surface free of projections and cavities which serves as a skid plate and is formed to inhibit snagging on objects as the cutting attachment rotates. A second self-cleaning cavity which opens outwardly in an opposite second direction is formed by a generally smooth outer surface of the central wall portion and a generally smooth inner surface of the outer wall portion which inclines outwardly and in the second direction with respect to the axis of rotation.

Coupling means is carried by the coupling portion for coupling the body to the cutting device to cause rotation about the axis of rotation. In one embodiment, the coupling means includes an adapter having first and second clamping elements for clamping the central portion of the cutting attachment therebetween. The second clamping element include means for removably securing the adapter to a rotatable drive member of a trimming device.

A plurality of spaced apart radially extending cutting elements are carried by the body for cutting vegetation as the body rotates about the axis of rotation. These cutting elements can be in the form of cutting blades and/or cutting strings. Cutting blades are provided with aerodynamic configurations, serrated edges, inner and outer cutting edges (the inner edge being exposed after the outer edge is worn), and means for securing the blades to the cutting attachment which permit longitudinal movement of the cutting blade with respect to the cutting attachment. Cutting strings are provided with inner and outer cutting portions (the inner cutting portion being exposed after the outer cutting portion is worn), grooves for reducing fraying and spiraled configurations.

FIG. 2 is a cross-sectional view of the cutting attachment shown in FIG. 1 taken along the line 2—2 of FIG. 1.

Figure 1:
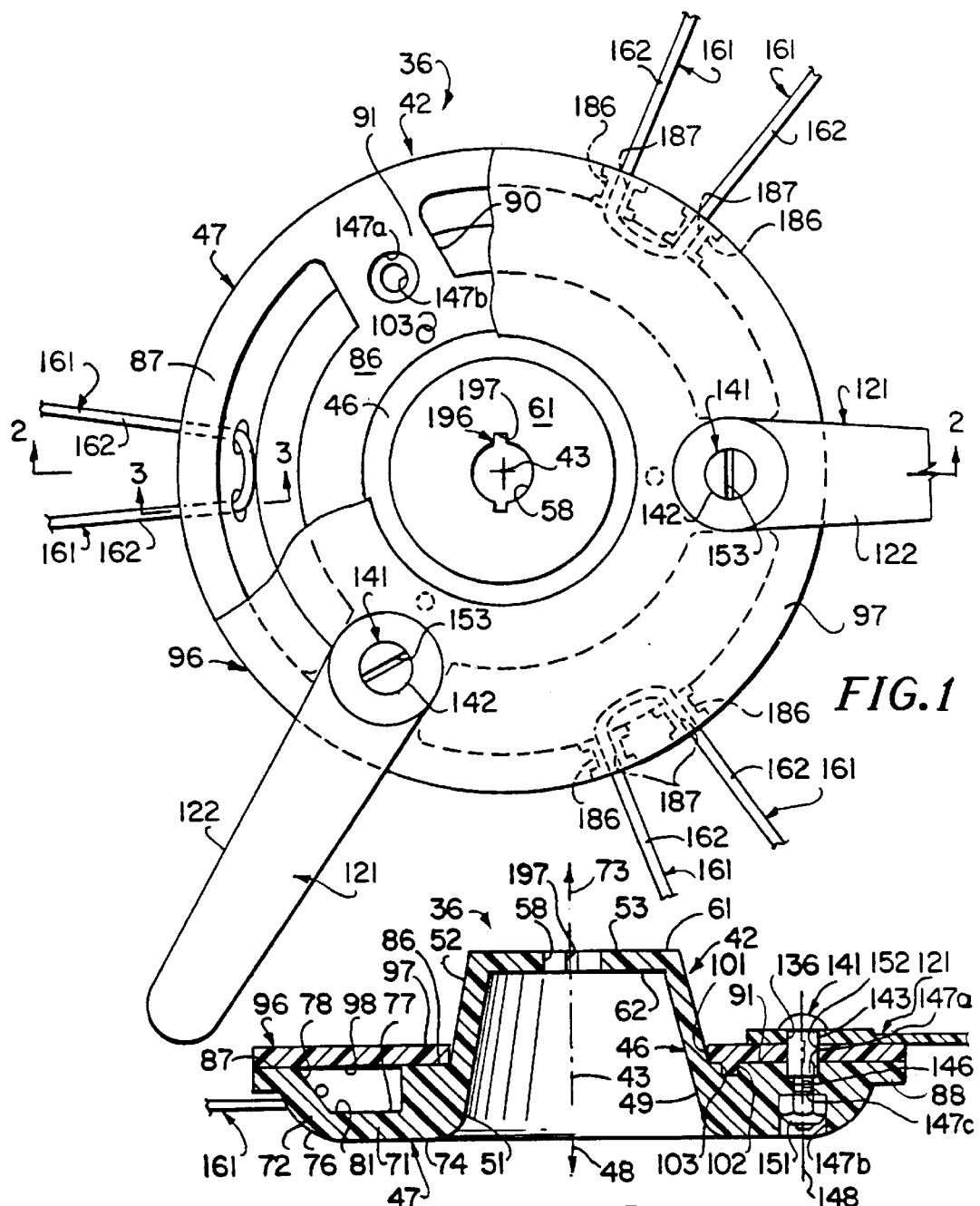
FIG. 1 is a top plan view of a cutting attachment of the present invention.
Figure 4:
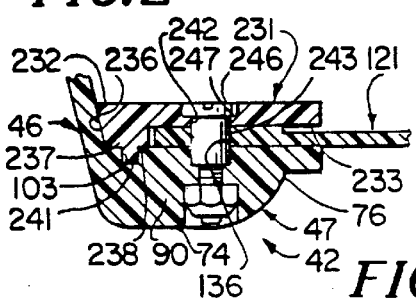

FIG. 4. is a fragmentary cross-sectional view, similar to FIG. 2, of the cutting attachment shown in FIG. 1 with another cover plate which can be used therewith.

FIG. 5. is a bottom plan view of another cover plate which can be used with the cutting attachment shown in FIG. 1.

FIG. 6. is a cross-sectional view, similar to FIG. 2, of another embodiment of the cutting attachment of the present invention.

FIG. 7. is an enlarged view taken along the line 7—7 of FIG. 6.

FIG. 8. is a fragmentary side elevational view taken along the line 8—8 of FIG. 6.

Figure 10:
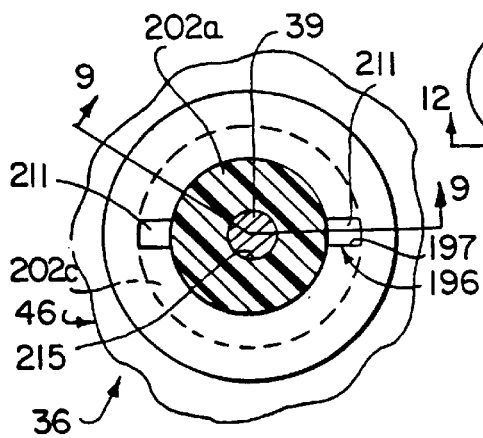

FIG. 9 is a cross-sectional view of an adapter which can be used with the cutting attachment shown in FIG. 1 taken along the line 9—9 of FIG. 10.

FIG. 10 is a fragmentary cross-sectional view taken along the line 10—10 of FIG. 9.

Figure 11:
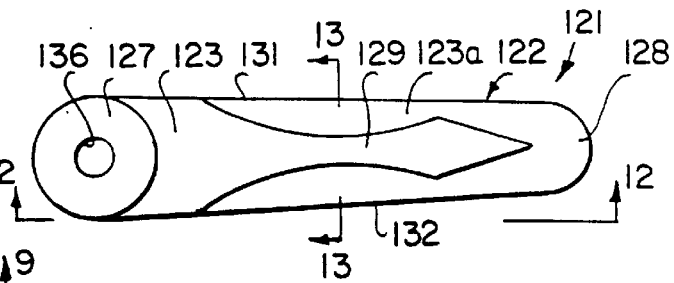

FIG. 11 is a top plan view of a cutting blade for use with the cutting attachment shown in FIG. 1.

Figure 12:
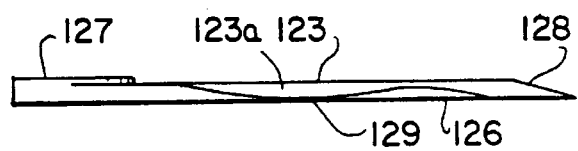

FIG. 12 is a side elevational view taken along the line 12—12 of FIG. 11.

Figure 13:
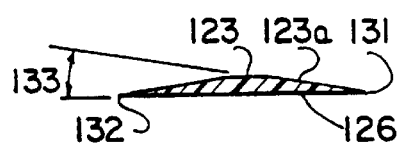

FIG. 13 is a cross-sectional view taken along the line 13—13 of FIG. 11.

Figure 14:
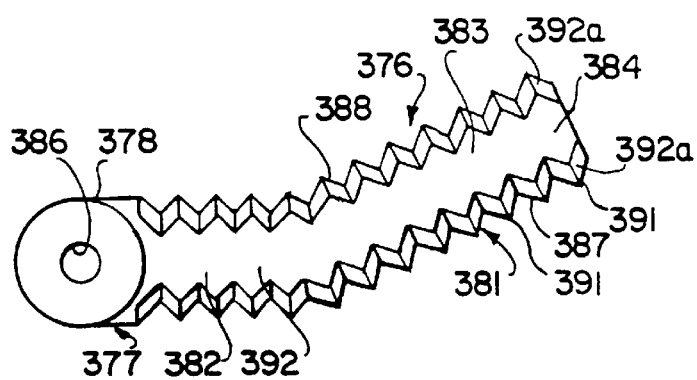

FIG. 14 is a top plan view of another cutting blade which can be used with the cutting attachment shown in FIG. 1.

Figure 15:
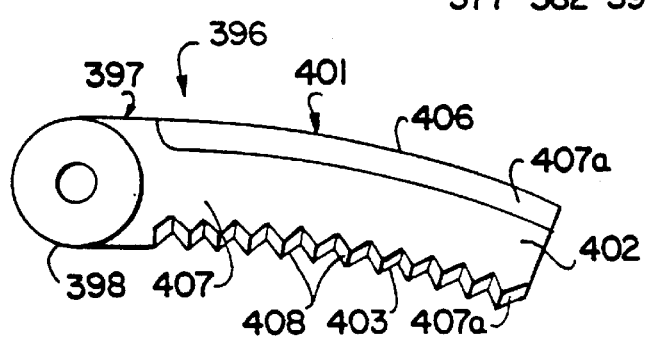

FIG. 15 is a top plan view of another cutting blade which can be used with the cutting attachment shown in FIG. 1.

FIG. 16 is a top plan view of another cutting blade which can be used with the cutting attachment shown in FIG. 1.

FIG. 17 is a cross-sectional view taken along the line 17—17 of FIG. 16.

FIG. 18 is a cross-sectional view, similar to FIG. 17, of another cutting blade which can be used with the cutting attachment shown in FIG. 1.

FIG. 19 is a top plan view of another cutting blade which can be used with the cutting attachment shown in FIG 1.

FIG. 20 is a cross-sectional view taken along the line 20—20 of FIG. 19.

FIG. 21 is a top plan view of another cutting blade which can be used with the cutting attachment shown in FIG 1.

FIG. 22 is a side elevational view of a cutting string which can be used with the cutting attachment shown in FIG. 1.

FIG. 23 is a cross-sectional view taken along the line 23—23 of FIG. 22 with the opening of an eyelet superimposed thereon.

FIG. 24 is a cross-sectional view of another cutting string which can be used with the cutting attachment shown in FIG. 1 with the opening of an eyelet superimposed thereon.

FIG. 25 is a cross-sectional view of another cutting string which can be used with the cutting attachment shown in FIG. 1 with the opening of an eyelet superimposed thereon.

FIG. 26 is a cross-sectional view of another cutting string which can be used with the cutting attachment shown in FIG. 1 with the opening of an eyelet superimposed thereon.

FIG. 27 is a side elevational view of another cutting string which can be used with the cutting attachment shown in FIG. 1.

FIG. 28 is a cross-sectional view taken along the line 28—28 of FIG. 27.

FIG. 29 is a side elevational view of another cutting string which can be used with the cutting attachment shown in FIG. 1.

Figure 30:
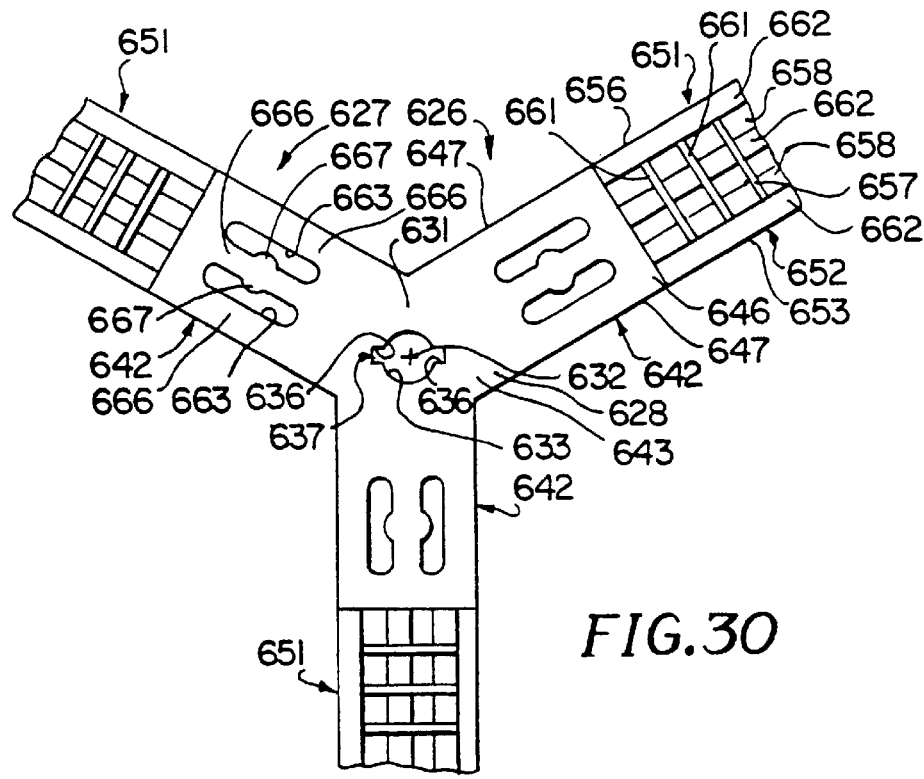

FIG. 30 is a fragmentary top plan view of another embodiment of the cutting attachment of the present invention.

Figure 31:
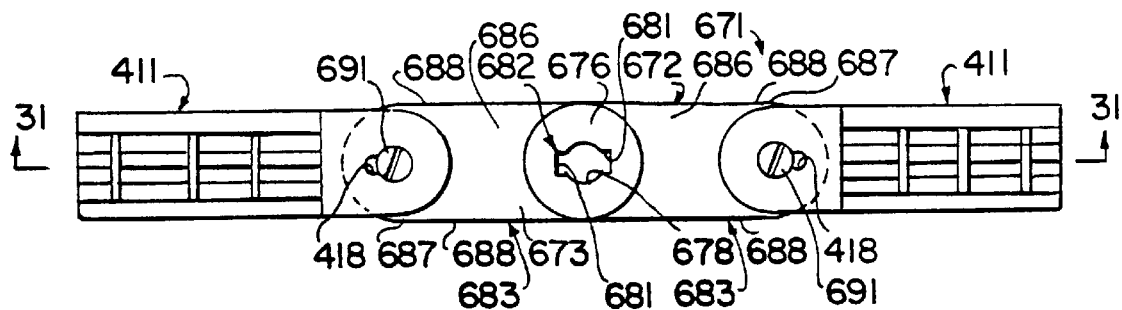

FIG. 31 is a top plan view of another embodiment of the cutting attachment of the present invention.

Figure 32:
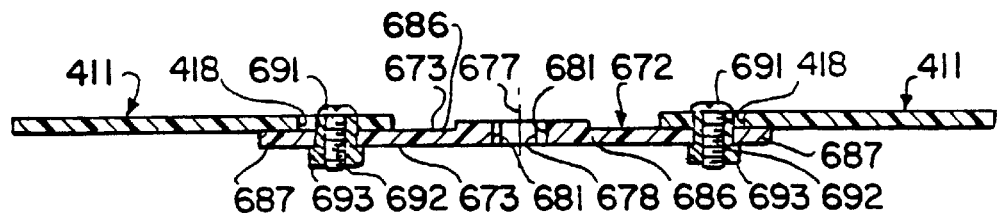

FIG. 32 is a cross-sectional view taken along the line 32—32 of FIG. 31.

Figure 33:
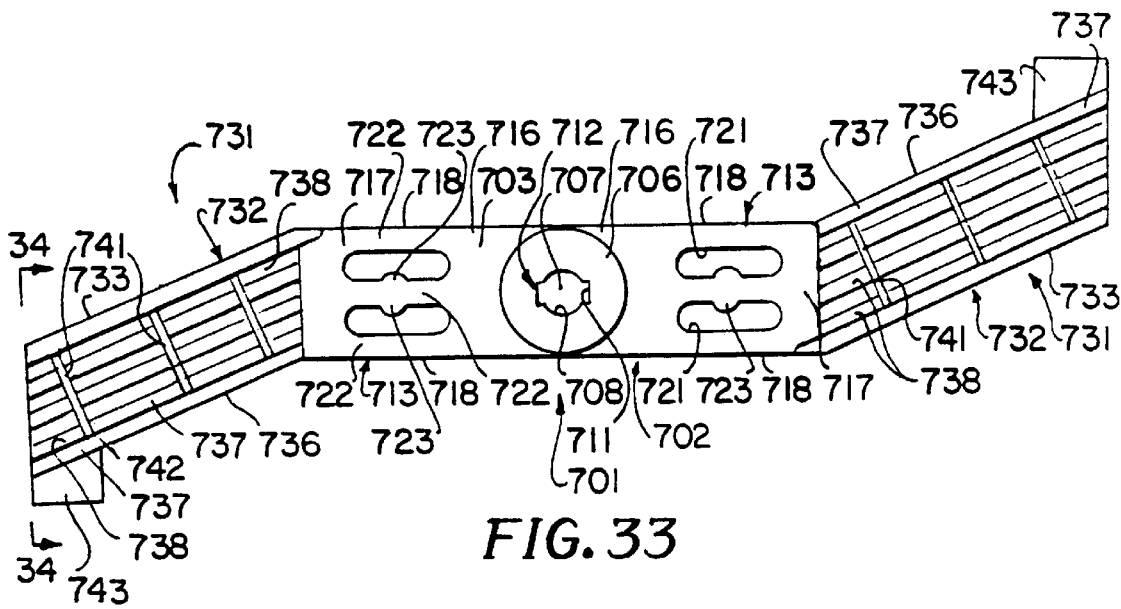

FIG. 33 is a top plan view of another embodiment of the cutting attachment of the present invention.

Figure 34:
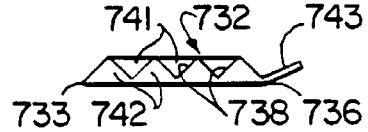

FIG. 34 is a side elevational view taken along the line 34—34 of FIG. 33.

Figure 35:
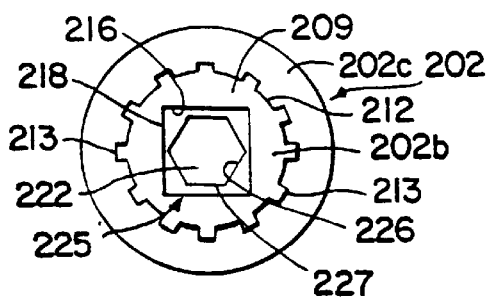

FIG. 35 is a bottom view of the adapter shown in FIG. 9 taken along the line 35—35 of FIG. 9.

Figure 36:
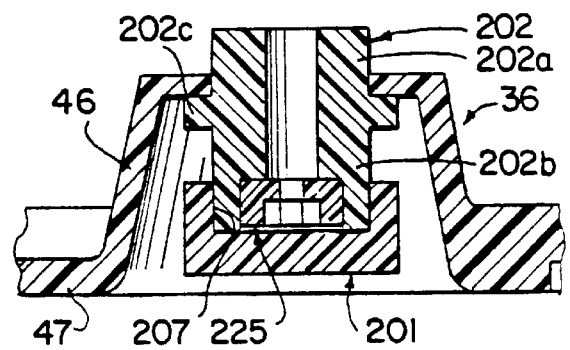

FIG. 36 is a fragmentary cross-sectional view of the cutting attachment shown in FIG. 1 together with the adapter shown in FIG. 9.

Figure 37:
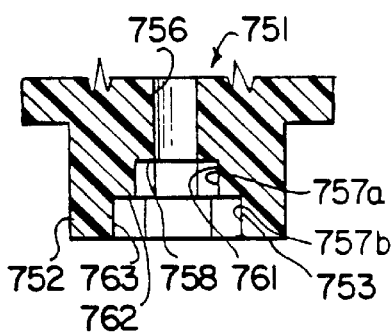

FIG. 37 is a fragmentary cross-sectional view of another adapter which can be used with the cutting attachment shown in FIG. 1.

FIG. 38. is cross-sectional view of another cutting string which can be used with the cutting attachment shown in FIG. 1 with the opening of an eyelet superimposed thereon.

FIG. 39 is a cross-sectional view of another cutting string which can be used with the cutting attachment shown in FIG. 1 with the opening of an eyelet superimposed thereon.

FIG. 40 is a cross-sectional view of another cutting string which can be used with the cutting attachment shown in FIG. 1 with the opening of an eyelet superimposed thereon.

FIG. 41 is a cross-sectional view of another cutting string which can be used with the cutting attachment shown in FIG. 1 with the opening of an eyelet superimposed thereon.

Figure 42:
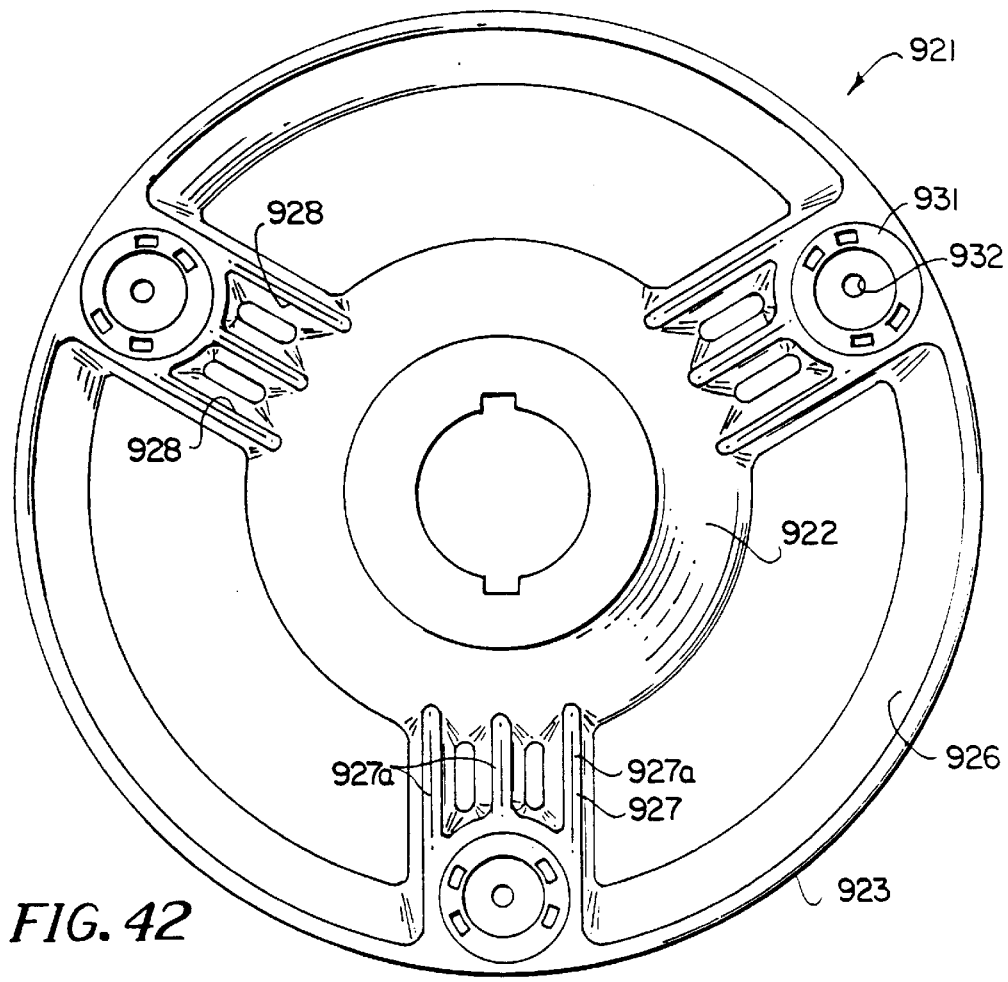

FIG. 42 is a top plan view of another embodiment of the cutting attachment of the present invention.

Figure 43:
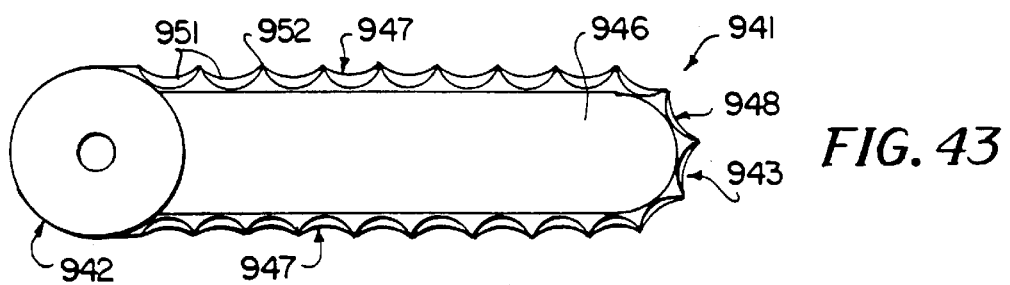

FIG. 43 is a top plan view of a cutting blade which can be used with the cutting attachment shown in FIG. 42.

Figure 44:
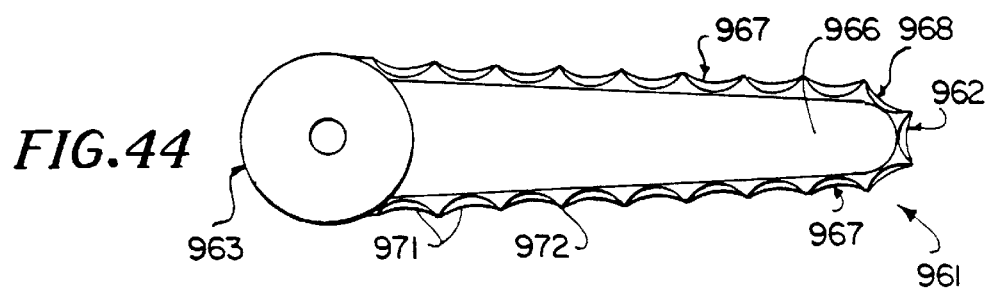

FIG. 44 is a top plan view of another cutting blade which can be used with the cutting attachment shown in FIG. 42.

More in particular, as shown in FIG. 9 of the drawings, a conventional vegetation trimming or cutting device 35 with which the cutting attachment 36 of the present invention can be used is manufactured by Inertia Dynamics Corp., 550 N. 54th Street, Chandler, Ariz. 85226. Trimming device 35 has a member 37 with an inner clamping surface 38 which is generally planar. A rotatable drive member in the form of drive shaft 39 perpendicularly extends through member 37 and protrudes from clamping surface 38. Drive shaft 39 is generally circular in cross-section and has an axially aligned threaded bore 40 which commences on the end thereof.

Cutting attachment 36 is comprised of a unitary one-piece rigid body 42 which is generally conical in shape and formed from a suitable material such as high strength plastic. Rigid body 42 has a central axis of rotation 43 and includes a first or central wall portion 46 and a second or outer wall portion 47 (See FIGS. 1 and 2).

Central wall portion 46 extends outwardly and in a first direction with respect to axis 43, shown by first direction arrow 48 in FIG. 2, and has a generally smooth inner surface 49, which forms a conically-shaped first or central cavity 51 disposed symmetrically about axis 43, and an opposite generally smooth outer surface 52. When cutting attachment 36 is resting on a horizontal surface, axis 43 is generally vertical and first direction 48 points generally vertically downwardly. An inwardly extending horizontal wall portion or lip 53 adjoins the upper and inner extremity of central wall portion 46 and is provided with a centrally disposed hole or opening 58 therein which is generally circular in cross-section. Coupling portion or lip 53 has an upper or outer surface 61, which serves as the top surface of cutting attachment 36, and a lower or inner surface 62, which serves as an inner surface for central cavity 51.

Bottom or circular outer wall portion 47 adjoins central wall portion 46 at the bottom or lower extremity thereof and extends generally radially outwardly from axis 43. More particularly, outer wall portion 47 is comprised of a first or generally horizontal part 71 which adjoins central wall portion 46 and extends radially outwardly from axis 43 and a second part 72 which adjoins first part 71 and extends generally in a second direction, opposite first direction 48 and shown by second direction arrow 73 in FIG. 2, and radially outwardly from axis 43. Outer wall portion 47 has a generally smooth outer or bottom surface free of projections and cavities formed by generally planar lower surface 74 of horizontal part 71, which adjoins inner surface 49 of central wall portion 46, and generally arcuate outer surface 76 of a second part 72, which adjoins lower surface 74 and extends further radially outwardly from axis 43 and in second direction 73. Outer wall portion 47 has a generally smooth inner surface formed by upper generally planar surface 77 of first part 71 and inner surface 78 of second part 72. Inner surface 78 is generally conical in shape, being inclined with respect to upper surface 77 and extending generally outwardly and in second direction 73 with respect to axis 43.

Inner surface 78 of outer wall portion 47, together with outer surface 52 of central wall portion 46, form a second or outer cavity 81 in cutting attachment 36. The opening to outer cavity 81 is bordered by inner and outer surfaces which are generally coplanar and horizontal. Outer surface 52 of central wall portion 46 is divided by an annular shoulder 86 which serves as the inner horizontal surface. Outer wall portion 47 ends in a generally annular end surface 87 which serves as the outer horizontal surface. End surface 87 extends radially outwardly from axis 43 and second part outer surface 76 to form one side of an annular ridge 88 formed on second part 72 of outer wall portion 47 and extending generally radially outwardly from surface 76.

A plurality of reinforcing ribs or bosses 90 are provided in outer cavity 81 and are approximately equivalently spaced circumferentially about outer wall portion 47, as for example 120° apart. Among other things, bosses 90 contribute rigidity to body 42, being joined on one side to central wall portion 46 and on the other side to second part 72 of outer wall portion 47. Each boss 90 has an upper surface 91 which is generally coplanar with annular shoulder 86 and end surface 87. Bosses 90 can be hollowed in a manner known to those skilled in the art to reduce the weight of cutting attachment 36 and be within the scope of the present invention.

An accessory in the form of a cover plate or ring 96 is included within cutting attachment 36 for those users wishing to cover outer cavity 81. Cover plate 96 is generally circular when viewed in plan, as illustrated in FIG. 1, and is formed from first or top and second or bottom planar surfaces 97 and 98, as shown in FIG. 2. The cover plate is provided with a centrally disposed hole or opening 101 dimensioned to snugly circumscribe and cooperatively mate with central wall portion 46. When mounted on body 42, bottom surface 98 of cover plate 96 abuts and is disposed on annular shoulder 86 and end surface 87, with central wall portion 46 protruding through cover plate opening 101. For angularly positioning cover plate 96 on body 42, bottom surface 98 thereof is provided with a plurality of prongs or pins 102 extending perpendicularly therefrom adjacent opening 101. Pins 102 are approximately equivalently spaced from and circumferentially about axis 43 and are dimensioned for disposition in an equal plurality of vertically aligned bores 103 provided in annular shoulder 86 to receive pins 102.

Cutting attachment 36 includes a plurality of spaced-apart radially extending cutting elements carried by body 42 for cutting vegetation as the body rotates about axis 43. The cutting elements can be in the form of cutting blades 121 mounted on outer wall portion 47 as shown in FIG. 1. Each blade 121 is formed from an elongate flat planar body 122 of a high-impact plastic having first and second spaced-apart generally parallel surfaces 123 and 126 and proximal or inner and distal or outer extremities 127 and 128 with an intermediate portion 129 therebetween (See FIGS. 11 through 13). First and second opposite and generally parallel cutting edges 131 and 132 extend along intermediate portion 129 and serve as sides to surfaces 123 and 126, with surfaces 123 and 126 extending in directions generally perpendicular to edges 131 and 132. Each of edges 131 and 132 is vee-shaped in cross-section with an approximately equivalent inclination angle, identified by inclination angle 133 in FIG. 13 with respect to edge 131, and is formed by an inclined portion 123a on first surface 123 which slopes outwardly toward second surface 126. When body 122 is viewed in cross-section, as in FIG. 13, inclined portions 123a extends generally linearly from one side thereof to the other side thereof.

More specifically, elongate body 122 of cutting blade 121, when viewed in plan, has rounded proximal and distal extremities 127 and 128 and generally straight edges 131 and 132 which taper inwardly as they extend from proximal extremity 127 to distal extremity 128. First edge 131 extends half-way around distal extremity 128 to meet second edge 132 at the approximate centerline of cutting blade body 122, with inclination angle 133 of first and second edges 131 and 132 gradually decreasing as the edges extend around distal extremity 128 to so meet. In this manner, edges 131 and 132 become generally sharper and more pronounced as they extend around distal extremity 128.

Inclination angle 133 of opposite edges 131 and 132 for portions of intermediate body portion 129 of cutting blade 121 is also less than inclination angle 133 for other portions of cutting blade 121, for example, between such portions and each of proximal and distal extremities 127 and 128. This is a result of opposite inclined portions 123a of intermediate body portion 129 extending arcuately inwardly toward each other and the centerline of elongate body 122, as illustrated in FIG. 11 when cutting blade 121 is viewed in plan.

Securement means adapted to secure elongate body 122 to cutting attachment 36 is carried by proximal extremity or mounting portion 127 and is in the form of bore 136 which is generally circular in cross-section and extends perpendicularly between surfaces 123 and 126 through body 122.

Mounting means is provided for mounting cover plate 96 to rigid body 42 and for pivotly mounting and attaching cutting blades 121 to outer wall portion 47 in a direction extending generally radially outwardly from axis of rotation 43. The mounting means includes a plurality of bolts 141, each with a head 142, a shoulder 143 and a threaded portion 146. Bosses 90 are provided with bores 147 extending generally perpendicularly through upper surface 91 thereof and first part lower surface 74. Each bore 147 is centrally aligned about a pivot axis 148 generally parallel to axis 43 and has a top bore portion 147a opening onto upper surface 91, a bottom bore portion 147b opening onto lower surface 74 and a central bore portion 147c therebetween. Top and central bore portions 147a and 147c are each generally circular in cross-section, with central bore portion 147c having a smaller radial dimension than top bore portion 147a. Bottom bore portion 147b is cross-sectionally configured and sized to non-rotatably retain a nut 151, and has a longitudinal dimension sufficient to recess nut 151 therein. Cover plate 96 has a plurality bores 152 extending generally perpendicularly through surfaces 97 and 98 spaced-circumferentially about the cover plate. Bores 152 are generally circular in cross-section and have angular and radial dimensions with respect to axis 43 which permit them to align with rigid body bores 147. Bores 151 and 147 so align when pins 102 on cover plate bottom surface 98 register with annular shoulder bores 103.

Cutting blade 121 is disposed over cover plate 96, generally abutting top surface 97 thereof, with bolts 141 extending through cutting blade bores 136 and cover plate bores 151. Each bolt shoulder 143 is adapted to seat in top bore portion 147a and is concentric with central bore portion 147c. The distance between bolt head 142 and shoulder 143 is dimensioned to permit cutting blade 121 to pivot about axis 148 during operation of cutting attachment 36 on trimming device 35. Bolt head 142 is provided with a transverse slot 153 on the top thereof which is adapted to receive a screwdriver so that bolt 141 can be threaded into self-locking nut 151 seated within bottom bore portion 147b.

Additional cutting elements in the form of six cutting strings 161 are carried by rigid body 42 and formed by three elongate flexible cutting lines 162 made from a suitable material such as high-impact plastic. Cutting lines 162 are equivalently spaced circumferentially about rigid body 42, for example 120° apart as shown in FIG. 1. Each cutting line 162 is generally circular in cross-section with a central longitudinal axis 163, and has at least three substantially continuous first projecting portions 166 extending longitudinally along the cutting line and spaced-circumferentially about the outer radially extremity thereof (See FIGS. 22 and 23). Each cutting line 162 also has at least three substantially continuous second projecting portions 167 also extending longitudinally along the cutting line and spaced-circumferentially about the outer radial extremity thereof. First projecting portions 166 are angularly spaced about axis 163 at equivalent intervals of approximately 120° and second projecting portions 167 are angularly spaced about axis 163 at equivalent intervals of approximately 120°, each second projecting portion 167 being located between adjoining first projecting portions 166.

Each first projecting portion 166 is formed by two generally angularly spaced-apart side surfaces 168, which extend generally radially outwardly from axis 163 to an approximate equivalent radial dimension 171, and an interconnecting outer surface 172 formed by an arc of radial dimension 171 (See FIG. 23). Outer surface 172 serves as the outer radial extremity of each first projecting portion, with each first projecting portion 166 having a radial dimension 171 which is approximately equivalent. Each side surface 168 is generally parallel to the opposed side surface 168 of the adjoining first projecting portion 166 and adjoins outer surface 172 to form a first or outer cutting edge 173 which is approximately vee-shaped in cross-section. As such, each first projecting portion 166 has two cutting edges 173. Opposed side surfaces 168 are angularly positioned about axis 163 in close proximity to each other so that three sets of adjacent cutting edges 173 are formed circumferentially about cutting string 161.

Second projecting portions 167 are recessed radially below outer surfaces 172 and between opposed side surfaces 168 of adjoining first projecting portions 166. Each second projecting portion 167 is formed by two surfaces 176 extending longitudinally along cutting line 162 and radially outwardly from the inner extremity of opposed side surfaces 168. Surfaces 176 extend toward the opposed side surface 168 of the adjoining first projecting portion 166 to meet and form a second or inner cutting edge 177 which is generally vee-shaped in cross-section. Cutting edge 177 serves as the radial extremity of each second projecting portion 167, with each second projecting portion having an approximately equivalent radial dimension 178 from axis 163 which is less than radial dimension 171 of first projecting portions 166.

Figure 3:
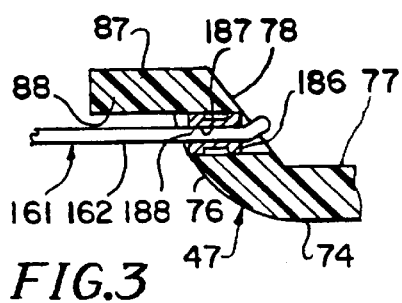
FIG. 3 is a cross-sectional view of the cutting attachment shown in FIG. 1 taken along the line 3—3 of FIG. 1.

Mounting means is provided by rigid body 42, in the form of flanged eyelets or grommets 186, for mounting cutting strings 161 on outer wall portion 47 in a direction extending generally radially outwardly from axis of rotation 43. Grommets 186 are generally tubular in shape and are provided with an opening or bore 187 which extends longitudinally therethrough (See FIG. 3). Bore 187 is formed by an inner surface 188 which is generally circular in cross-section. Second part 72 of outer wall portion 47 is formed with adjoining pairs of grommets 186 extending therethrough. Adjoining grommets 186 are spaced circumferentially apart about outer wall portion 47, with each grommet bore 187 generally aligned with a radius extending outwardly from axis of rotation 43 (See FIG. 1). The central portion of cutting line 162 is disposed in outer cavity 81 between two grommets 186. The spaced apart end portions of the cutting line 162 extend outwardly through the adjoining grommets 186. Outer surfaces 172 of first projecting portions 166 are adapted for engagement with inner surface 188 of grommets 186.

Coupling means is carried by central wall portion 46 and is adapted to couple rigid body 42 to trimming device 35 to cause rotation of cutting attachment 36 about axis of rotation 43. The coupling means comprises a keyway system 196 which includes a keyway formed by a pair of slots 197 diametrically disposed on opposite sides of opening 58 in lip 53. Opening 58 and slots 197 are substantially similar to the related opening and slots described in U.S. Pat. No. 4,856, 194 as part of the keyway system described therein.

The coupling means further includes an adapter assembly 198 having first or spacer and second or sleeve clamping elements 201 and 202, illustrated in FIGS. 9, 10, 35 and 36, made of a suitable material such as high-strength plastic. Adapter assembly 198 also permits cutting attachment 36 to be used with trimming devices manufactured by McCULLOCH CORP., Box 11990, Tucson, Ariz. 85734-1990 and Homelite Textron, 14401 Carowinds Blvd., Charlotte, N.C. 28241.

Disk-shaped spacer clamping element 201 is generally circular in cross-section with first or upper and second or lower generally parallel and planar opposite surfaces 203 and 205. Upper and lower surfaces 203 and 205 are provided with respective centrally disposed recesses 206 and 207 therein. Lower surface 205 serves as a clamping surface, with recess 207 having a diameter substantially equivalent to the diameter of lip opening 58. Spacer element 201 is provided with a centrally disposed bore 208 which extends perpendicularly through surfaces 203 and 205 and opens into the center of recesses 206 and 207 thereon. Bore 208 is adapted to snugly receive drive shaft 39 of trimming device 35 and is so configured and dimensioned. Spacer element 201 is a solid body, but can be hollowed to reduce weight and manufacture costs and be within the scope of the present invention.

Sleeve clamping element 202 is generally cylindrical in shape and has a first end portion or pilot 202a and an opposite second or lower end portion 202b, with an end 209, separated by a central portion or annular ring 202c. End portions 202a and 202b are each generally circular in cross-sectional configuration, with an approximately equal radial dimension. Annular ring 202c extends radially outwardly from end portions 202a and 202b, and has an annular clamping surface or shoulder 210 which faces end portion 202a and extends perpendicularly outwardly therefrom. Pilot 202a is provided with a pair of diametrically disposed ears or keys 211 which extend upwardly from shoulder 210 and are adapted to fit into the keyway provided by diametrically disposed slots 197 in opening 58. Keys 211 are part of keyway system 196. Lower end portion 202b has an outer surface 212 with a plurality of splines 213 formed thereon which act as gripping means.

Sleeve element 202 is provided with a centrally disposed bore 215 which extends longitudinally through end portions 202a and 202b and opens into a recess or receptacle 216 provided in end 209. Bore 215 is adapted to snugly receive drive shaft 39 and is so configured and dimensioned. Receptacle 216 is formed by a planar stop surface 217 which is generally parallel with end 209 and an inner surface 218 which is generally rectangular in cross-sectional configuration.

When cutting attachment 36 is mounted to trimming device 35, spacer element 201 is first slipped over the protruding end of drive shaft 39. A disk-shaped washer 219 is sandwiched between trimming device clamping surfaced 38 and spacer upper surface 203, with a portion of the washer seated in spacer recess 206. Cutting attachment 36 is next slipped over the protruding end of drive shaft 39. Drive shaft 39 extends through opening 58, and top surface 61 of lip 53 generally abuts lower surface 205 of spacer element 201. Cutting attachment is positioned thereon so that opening 58 is colinear about axis 43 with drive shaft 39. Sleeve element 202 is disposed on the end of drive shaft 39 with the drive shaft extending into bore 215 thereof. Pilot 202a extends through opening 58 and is disposed in spacer element recess 207 when keys 211 angularly align about axis of rotation 43 with slots 197 in opening 58. Spacer element bore 208 and sleeve element bore 212 are aligned to permit the disposition of pilot 202a within spacer element recess 207. The interlocking spacer and sleeve elements 201 and 202 contribute to the rigid connection of trimming device 35 and cutting attachment 36.

Means adapted to removably secure sleeve element 202 to drive shaft 59 is provided in the form of a bolt 221, often part of trimming device 35, having an hexagonal head 222 and threaded portion 223. Bolt adapter means in the form of socket 225 is disposed and recessed in receptacle 216 and can be included in this securement means. Socket 225, as illustrated in FIGS. 9 and 35, is generally U-shaped in cross-section and is provided with a recess 226 therein formed in part by an inner surface 227. Bolt head 222 is seated and recessed in socket recess 226, with inner surface 227 being cross-sectionally configured and dimensioned to non-rotatably receive hexagonal bolt head 222. Bolt threaded portion 223 extends into sleeve bore 215 and is threadedly disposed in drive shaft bore 40.

Rotation of sleeve element 202 and/or cutting attachment 36 in a tightening direction about axis 43 causes drive shaft 39 to approach stop surface 217 and socket 225 and the sleeve element to rotatably lock with the drive shaft. Cooperatively mating socket 225 and sleeve inner surface 218 cause the socket to rotate with sleeve element 202, while cooperatively mating bolt head 222 and socket inner surface 227 cause bolt 221 to also rotate with the sleeve. No tools are needed for mounting cutting attachment 36 to trimming device with adapter assembly 198. Splines 213 provided on sleeve lower end portion 202b facilitate the tightening of bolt 221 to drive shaft 39 and the resulting mounting of cutting attachment 36 to cutting device 35.

When cutting attachment 36 is so mounted to trimming device 35, spacer and sleeve elements 201 and 202 serve to clamp central wall portion 46 of rigid body 42 between opposite facing clamping surface 205 and annular shoulder 210. Spacer and sleeve elements 201 and 202 and the bores therein are longitudinally dimensioned to permit this clamping. Keys 211 carried by sleeve element 202 and slots 197 provided in central wall portion 46, which are included in keyway system 196 and act as cooperative key means, serve to ensure a positive rotational connection between drive shaft 39 and cutting attachment 36. Cutting attachment 36 includes self-locking means which causes the rotational force exerted on cutting attachment 36 by encountered objects to tighten bolt 221 with respect to drive shaft 39. Bolt 221 and drive shaft bore 40 are cooperatively threaded to tighten when bolt 221 is exerted on by these rotational forces. The mating cross-sectional configurations of sleeve inner surface 218, socket inner surface 227 and bolt head 222 permit transference of these rotational forces from cutting attachment 36 and sleeve element 202 to bolt 221.

Operation and use of cutting attachment 36 shown in FIG. 1, with cover plate 96, cutting blade 121 and cutting strings 161 mounted thereon, is now briefly described. Spacer and sleeve elements 201 and 202 are sized and configured to permit economical and space efficient shipment thereof with cutting attachment 36. Sleeve element 202 can be shipped in its operational position with pilot 202a disposed in central wall portion opening 58 as illustrated in FIG. 36. Spacer element 201 can be mounted on sleeve lower end portion 202b which is radially sized for relatively snug disposition in spacer recess 207. Socket 225 is housed in receptacle 216, retained in place by spacer element 201. Spacer recess 207 is longitudinally sized so that both spacer and sleeve elements can be housed within central cavity 51.

Cutting attachment 36 is secured to trimming device 35 by adapter assembly 198 in the manner discussed above. Various sockets 225 can be provided with cutting attachment 36 for permitting mounting of the cutting attachment on a variety of trimming devices similar to trimming device 35. Inner surfaces 227 of these sockets would vary in configuration and size to accommodate the respective mounting bolts of these trimming devices. Socket 225 can also be removed from sleeve element 202 for larger mounting bolts, sleeve inner surface 218 being sized and configured to non-rotatably receive the head of such a larger bolt.

Trimming device 35 is placed in operation in a conventional manner in close proximity to the ground from which the weeds or grass are being cut. Cutting attachment 36 is symmetrically balanced to permit high speed rotation about axis 43. In this regard, opening 58, central cavity 51 and outer cavity 81 are generally coaxial with axis 43. As soon as cutting attachment 36 rotates about axis of rotation 43, the centrifugal forces exerted on cutting blades and strings 121 and 161 cause them to extend generally radially outwardly from axis 43 for encountering vegetation.

One of edges 131 or 132 of cutting blade 121 is forwardly projecting during rotation of cutting attachment 36 and serves as a leading cutting edge for encountering and cutting the desired vegetation. The other edge on cutting blade 121, opposite the leading edge, serves as a trailing edge. The relatively small inclination angles 133 at intermediate portion 129 and distal extremity 128 of cutting blade elongate body 122, which are each smaller than inclination angle 133 at the other portions of the leading and trailing cutting edges 131 and 132 of elongate body 122 and the inclination angle of other conventional cutting blades, serves to reduce the frictional drag experienced by cutting blade 121 as it slices through the air. In this manner, the aerodynamically efficient configuration of cutting blade 121 serves to increase the speed at which the cutting blade rotates about cutting attachment 36 and thereby increase the cutting forces exerted on encountered vegetation by the cutting blade. It also reduces the drag on the cutting and drive systems.

The cross-sectional configuration of cutting string 161 serves several functions. It has been found, for example, that cutting strings having outwardly projecting cutting edges as radial extremities which bear on inner bore-forming surfaces (such as surfaces 188 of grommets 186) during use of cutting attachment 36 tend to cause significant wear to these grommet inner surfaces. Arcuate outer surfaces 172 of first projecting portions 166 generally conform with the circular cross-sectional configuration of bores 187 in grommets 186 and, accordingly, reduce the wear on inner bore-forming surfaces 188. It has also been found that cutting strings with generally smooth arcuate outer surfaces such as surface 172 are more aerodynamic than cutting strings with projecting edges which serve as the radial extremity thereof. Cutting string 161 is formed with minimal air pockets which can cause variations in cutting height.

Cutting string 161 has two sets of cutting edges, one set which is available at the initial use and the second set which becomes available after the first set is worn away, and as a result can be said to have renewable edges. Outer cutting edges 173, which are aligned in pairs circumferentially about cutting string 161, serve as initial cutting edges during operation of the cutting strings. As outer protecting portions 166 are worn away during operation of trimming device 35, through dulling and/or fraying, cutting edges 177 of inner protecting portions 167 are exposed so as to extend the cutting life of the cutting string. Since cutting string wear occurs near the tip of the string, the grommet protecting characteristics of first projecting portions 166 are not affected by this wear.

The cross-sectional configuration of cutting string 161 also serves to contribute significant mass to the cutting string, as illustrated in FIG. 23 where the opening of an eyelet is superimposed thereon. Greater mass tends to increase cutting power. Many conventional cutting strings are formed with a plurality of cutting edges having voids therebetween which decrease the mass of the cutting string.

Each of cutting blades 121 and cutting strings 161 can move from a first position extending generally radially outwardly from cutting blade body 42 for cutting vegetation to a second generally out-of-the-way position wherein the blades and strings are within the outer confines of body 42. With respect to cutting blades 121, the mounting means discussed above which permits the cutting blades to pivot in a plane generally perpendicular to axis of rotation 43 and the generally planar alignment of annular shoulder 86 and end surface 87 which the cutting blades and generally planar cover plate 96 overlie, permit cutting blades 161 to pivot to a second position generally overlying cover plate 96 when the cutting blades encounter an obstacle.

With respect to cutting strings 161, annular ridge 88, formed on the outer radial extremity of outer wall portion 47 and generally adjacent to the opening of grommet bores 187 and the cutting strings extending outwardly therefrom, serves as a protection ring for protecting the cutting strings from objects encountered by them and cutting attachment 36 during operation of trimming device 35. Most desirably, ridge 88 should project outwardly from outer surface 76 a distance at least equal to the thickness of cutting lines 162. It should be appreciated that ridge 88 can have other configurations and locations on body 42, including a location below grommets 186, and be within the scope of the present invention. Cutting lines 162 are locked in cavity 81 where they are protected from encountering objects and thus less susceptible to wear.

It should also be appreciated that a cutting attachment 36 having a fewer or greater number of cutting blades 121 and/or cutting strings 161 mounted thereon is within the scope of the present invention. For example, cutting attachment 36 could have two diametrically opposed cutting blades 121 mounted thereon and/or two diametrically opposed cutting lines 162 mounted thereon. Most desirably, cutting blades 121 and cutting strings 161 carried by body 42 should be symmetrically mounted thereon so as to maintain the balance of cutting attachment 36 during its rotatable use on trimming device 35. In addition, cutting strings 161 can be mounted to cover plate 96 and be within the scope of the present invention.

Relatively smooth bottom and outer surfaces 74 and 76 of outer wall portion 47 serve as a skid plate for cutting attachment 36 and are formed generally free of projections and cavities to inhibit snagging on objects as cutting attachment 36 rotates during operation. Bottom bore portions 147*b* which house nuts 151 therein are disposed on the bottom and outer surfaces of the outer wall portion so as to be free of any generally protruding rims or edges capable of catching on objects. Self-locking nuts 151 are recessed within bores 147 so as to be protected from damage and maintain the effectiveness of the skid plate.

Rigid body 42 is also constructed so that central wall portion 46 has a generally smooth inner surface 49 which is conical in shape for inhibiting the collection of weeds, grass and debris within central cavity 51. Inner surface 49, which opens outwardly in first direction 48, is generally self-cleaning during operation of trimming device 35 and causes any such weeds, grass or debris therein to be thrown outwardly away from axis of rotation 43 and downwardly from cutting attachment 36.

Among its various functions, cover plate 96 serves to further hinder the collection of debris within outer cavity 81. The cover plate also adds additional rigidity to cutting attachment 36. In addition, unlike cutting attachments formed from two pieces bolted together, such as that disclosed in U.S. Pat. No. 4,856,194, failure of cover plate fastening bolts 141 will not result in pieces of the cutting attachment flying loose. Because cover plate 96 is carried circumferentially about central wall portion 46, a loose cover plate will remain attached to cutting attachment 36.

Cutting attachment 36 can be operated without cover plate 96 mounted over outer cavity 81 and be within the scope of the present invention. Should cutting attachment 36 be so operated, outer cavity 81, which opens outwardly in second direction 73, is also generally self-cleaning during operation of cutting attachment. Outer wall portion inner surface 78 extends radially outwardly and, in the same manner as central wall portion inner surface 49, inhibits the collection of weeds, grass and debris therein.

The unitary and relatively simple design of cutting attachment 36 results in lower manufacturing costs than cutting attachments with comparable features which are generally comprised in two or more sections. Rigid body 42 is also relatively lightweight in comparison to comparable cutting attachments and can be adapted with cover plate 96 for covering outer cavity 81 should the user of cutting attachment 36 so desire.

The cover plate for use on rigid body 42 can have other configurations and be within the scope of the present invention. For example, in another embodiment illustrated in FIG. 4, a generally planar cover plate substantially similar to cover plate 96 is provided. Cover plate 231 has parallel planar and opposite first or top and second or bottom surfaces 232 and 233 and is provided with a centrally disposed opening or hole 236 therethrough. Opening 236 is dimensioned and configured to snugly abut outer surface 52 of central wall portion 46. Bottom surface 233 is formed with an annular reinforcing ring 237 adjacent opening 236 which extends downwardly therefrom in first direction 48 and ends with an annual and planar support surface 238 generally parallel with surfaces 232 and 233. Support surface 238 is formed with prongs or pins 241 spaced radially and circumferentially thereabout and aligned to cooperatively mate with bores 103 in annular shoulder 86 of rigid body 42.

Cover plate 231 is designed to be mounted on outer wall portion 47 so that cutting blades 121 are sandwiched between cover plate bottom surface 233 and outer wall portion end surface 87. In this regard, support ring 237 extends from bottom surface 233 a distance substantially equivalent to the width of cutting blade elongate body 122. The cover plate is provided with three bores 242 perpendicularly extending through surfaces 232 and 233 and spaced radially and circumferentially thereabout to align with bores 147 in outer wall portion 47. Means for mounting and attaching cover plate 231 and cutting blades 121 to outer wall portion 47 is substantially similar to the mounting and attaching means described above with respect to cover plate 96, and includes bolts 243 substantially similar to bolts 141. Bolts 243 have heads 246 which seat and are recessed in countersinks 247 provided in cover plate 231.

In operation and use, cover plate 231 serves substantially the same purpose as cover plate 96, except that cover plate 231 permits cutting blades 121 to pivot to a recessed position substantially within the interior of cutting attachment 36. Cutting blades 121 can pivot about bolts 246 from a first or a cutting position extending radially outwardly from outer wall portion 47 to a second or recessed position generally overlying outer cavity 81 and underlying cover plate 231.

In another embodiment, a generally planar cover plate 256 is provided which includes an inner ring 257 having a centrally disposed opening 258 configured and dimensioned to snugly circumscribe central wall portion 46 (See FIG. 5). Ring 257 has a bottom surface 261 which abuts annular shoulder 86 and is provided with three prongs or pins 262 extending outwardly therefrom in first direction 48 and spaced radially and circumferentially about the ring so as to cooperatively mate with annular shoulder bores 103. Ring 257 further includes three planar arm segments 263 extending radially therefrom and spaced circumferentially thereabout so as to overly bosses 90. Each arm segment 263 has a distal or outer end portion 263a disposed on outer wall portion end surface 87 and is provided with a bore 266 extending therethrough and aligned with bores 147 in bosses 90. Cover plate 256 is mounted on body 42 in substantially the same manner as cover plate 231, with cutting blades 121 sandwiched between cover plate 256 and surfaces 91 and 87 of outer wall portion 47, and serves as a reinforcing ring when mounting cutting blades 121 to body 42. Means for mounting and attaching cover plate 256 and cutting blades 121 includes bolts 243. Cover plate 256 is provided with countersinks 267 for seating bolt heads 246.

The cutting attachment can have other configurations and be within the scope of the present invention. For example, a cutting attachment 276 formed from a unitary rigid body 277 having an axis of rotation 278 is shown in FIGS. 6 through 8. Body 277 includes a central wall portion 281 centered on axis 278 and extending radially outwardly from axis 278 and in a first direction (shown by first direction arrow 282 in FIG. 6) at an angle from axis 278 greater than the inclined angle from axis 43 of central wall portion 46. Central wall portion 281 has inner and outer surfaces 283 and 286, inner surface 283 forming a self-cleaning first or central cavity 287 which is symmetrically disposed about axis 278 and is conical in shape. An inwardly extending horizontal wall portion or lip 288 generally perpendicular to axis 278 adjoins the inner or upper extremity of central wall portion 281 and has an inner surface 291 which serves as an end surface to central cavity 287 and an opposite upper surface 292. Coupling portion or lip 288 is provided with a centrally disposed opening 293 therein provided with diametrically opposed slots 296 substantially similar to slots 197 in rigid body 42.

A bottom or outer wall portion 297 adjoins the outer or lower extremity of central wall portion 281 and extends generally radially outwardly from axis 278. Outer wall portion 297 is formed from a first part 298 which extends radially outwardly and slightly in a second direction (opposite to first direction 282 and shown by second direction arrow 301 in FIG. 6) so as to be slightly conical in shape, a second part 302 extending radially outwardly and in second direction 301 at a lesser angle from axis 278 than the corresponding angle of first part 298 so as to be also conical in shape, and a short third part 303 extending in second direction 301 so as to be tubular in shape. First, second and third parts 298, 302 and 303 have respective opposite and generally smooth inner and outer surfaces 306 and 307, 308 and 311, and 312 and 313. Inner surfaces 306, 308 and 312, together with central wall portion outer surface 286, form a self-cleaning second or outer cavity 316. Outer surfaces 307 and 311 serve as a skid plate. Third part 303 is provided with a planar annular end surface 317 which is generally perpendicular to axis 278 and forms part of an annular protection ridge 318 projecting radially outwardly from third part outer surface 313.

Cutting elements such as cutting blades 121 can be mounted on cutting attachment body 277 and, in this regard, outer wall portion 297 is provided with a plurality of bosses 321 formed in outer cavity 316 which are substantially similar to bosses 90 and are approximately equivalently spaced circumferentially around the outer wall portion. Each boss is provided with a bore 322 through the boss and outer wall portion 297 which is substantially similar to bore 147, having a top bore portion 322a, a bottom bore portion 322b and a central bore portion 322c therebetween. Means for pivotally mounting and attaching cutting blades 121 to outer wall portion 297 is substantially similar to the means for mounting and attaching cutting blades 121 to cutting attachment body 42 and includes bolts 323, each with a head 326, a shoulder 327 and a threaded portion 328, and a nut 331. When a cutting blade 121 is mounted to rigid body 277, as illustrated in FIG. 6, the cutting blade rides on the top of boss 321 and annular end surface 317 and self-locking nut 331 is recessed within bottom bore portion 322b so as not to contact objects encountered by cutting attachment 276.

A plurality of cutting elements such as cutting strings 161 formed from cutting lines 162 can also be carried by cutting attachment 276 and be spaced circumferentially about rigid body 277 in substantially the same manner as the cutting strings are spaced about cutting attachment body 42. Means for mounting and attaching cutting lines 162 to outer wall portion 297 includes an opening 336 extending through surfaces 308 and 311 of second part 302 (see FIGS. 6 through 8). A cross member 337 substantially adjacent inner surface 308 and coplanar with axis 278 transverses opening 336 and assists in securing cutting line 162 to rigid body 277. The central portion of cutting line 162 is looped about cross member 337. The end portions of cutting line 162 extend from cross member 337 in opposite angular directions about outer cavity 316 and through flanged tubular grommets 338, substantially similar to grommets 186, formed in outer wall portion third part 303. Outer wall portion second part 302 and cross member 337 formed in opening 336 thereof are dimensioned so that cutting line 162 is recessed within opening 336 so as not to engage objects encountered by cutting attachment 276.

Cutting attachment 276 includes coupling means carried by central wall portion 281 adapted to couple rigid body 277 to a cutting device such as trimming device 35 and cause rotation about axis 278. The coupling means is in the form of a keyway system substantially identical to keyway system 196 and including lip opening 293 with slots 296 formed therein. Adapter assembly 198 is used in rotatably coupling cutting attachment 276 to trimming device 35.

In operation and use, cutting attachment 276 operates in substantially the same manner as cutting attachment 36 with the configuration and smooth surfaces of central and outer wall portions 281 and 297 forming cavities which inhibit the collection of grass, weeds and debris by causing them to be flung out from the cutting attachment. The generally smooth skid plate surfaces of outer wall portion 297 are generally free of projections and cavities capable of snagging objects encountered by cutting attachment 276. As a result, outer wall portion 297 enables cutting attachment 276 to skid over objects encountered by it. Cutting blades and strings 121 and 161 are each movable from an operable position extending radially outwardly from axis 278 to a nonoperable out-of-the-way position within the confines of rigid body 277 so as to minimize damage thereto when the rotating cutting attachment engages harmful objects.

Cutting attachments 36 and 276 can be used with other conventional vegetation cutting or trimming devices besides trimming device 35. As stated above, keyway system 196 described above is substantially similar to the cutting attachment keyway system described in U.S. Pat. No. 4,856,194, the terms and provisions of which are incorporated herein by this reference. In the same manner as the cutting attachments described in U.S. Pat. No. 4,856,194, cutting attachments 36 and 276 can be used with a conventional trimming device such as manufactured by Echo Incorporated of Lake Zurich, Ill., 60047 which is described in some detail in U.S. Pat. No. 4,856,194.

Cutting elements in the form of cutting blades for use on cutting attachments can have other configurations and be within the scope of the present invention. For example, a cutting blade 376 is illustrated in FIG. 14 which is formed from an elongate flat planar body 377 having a proximal extremity or mounting portion 378 and a cutting portion 381 formed from a generally straight first part 382 and a generally straight second part 383 at an oblique angle to first part 382 and having a distal extremity 384. Mounting portion 378 includes a bore 376 extending therethrough which serves as means for securing and pivotally mounting cutting blade 376 to a cutting attachment. Cutting portion 381 is formed with first and second opposite serrated cutting edges 387 and 388 which are each generally vee-shaped in cross-section and formed from a plurality of teeth 391. Elongate body 377 has first and second spaced-apart generally parallel surfaces 392 extending between edges 387 and 388 in directions generally perpendicular to the edges. Each of surfaces 392 have inclined portions 392a along the side thereof which serve to form edges 387 and 388.

In operation and use, cutting blade 376 is mounted to a cutting attachment such as cutting attachment 36 in the manner discussed above with one of serrated edges 387 and 388 positioned as a leading edge and the other as a trailing edge. Teeth 391 thereon assist in the trimming of vegetation encountered by rotating cutting attachment 36, acting to both saw and cut the vegetation as cutting blade 376 slices therethrough. Cutting blade 376 can be mounted on the cutting attachment with second part 383 angled toward the rotational direction of travel or away therefrom, depending upon the needs of the user. In most instances, it has been found that second part 383 should be angled toward the direction of travel when larger vegetation is desired to be cut. When so configured, the shearing forces of cutting blade 376 tend to be higher than when the cutting blade is positioned with second part 383 angled away from the direction of travel. On the other hand, positioning of second part 383 so that it angles away from the direction of travel facilitates better positioning of cutting blade 376 within the confines of the cutting attachment body 377 in the event an object is struck by the blade.

In another embodiment, a cutting blade 396 similar to cutting blade 376 is provided which is formed from an elongate flat planar body 397 having a mounting portion or proximal extremity 398, substantially similar to mounting portion 378, and a cutting portion 401 (See FIG. 15). Cutting portion 401 has a distal extremity 402, first and second opposite cutting edges 403 and 406 which are each generally vee-shaped in cross-section and first and second spaced-apart generally parallel surfaces 407 which extend between the edges and have inclined portions 407a which form the edges. First cutting edge 403 is serrated, being formed from a plurality of teeth 498. Cutting portion 401 is generally arcuate or curved when viewed in plan and has operational features similar to cutting blades 161 and 376 described above.

In another embodiment, a cutting element in a form of cutting blade 411 is provided as illustrated in FIGS. 16 and 17. Cutting blade 411 is formed from an elongate flat body 412 having a mounting portion 413 and a cutting portion 416 which includes a distal extremity 417. Mounting portion 413 is provided with a bore 418 therethrough which is generally oblong in cross-sectional shape, with the longer cross-sectional dimension generally aligned with longitudinally extending body 412. Cutting portion 416 is formed with first and second opposite cutting edges 421 and 422 which extend along the side thereof and, like edges 131 and 132 of cutting blade 121, are generally vee-shaped in cross-section. First and second spaced-apart generally parallel surfaces 423 and 426 extend between edges 421 and 422 in directions generally perpendicular to the edges.

Each of surfaces 423 and 426 are provided with a plurality of parallel vee-shaped grooves or indentations 427 situated between first and second cutting edges 421 and 422 which generally extend the length of surfaces 423 and 426 in directions parallel to the cutting edges. Cutting portion 416 is further provided with a plurality of spaced-apart parallel reinforcing portions or ribs 428 which extend generally transversely of cutting edges 421 and 422. More particularly, reinforcing ribs 428 extend perpendicularly between the cutting edges and across indentations 427 and serve to segment the aligned indentations 427. As illustrated in FIG. 17, indentations 427 serve to partition cutting portion 416 into a plurality of parallel knife elements 431 which are in juxtaposition with each other and have opposed and interconnected inner cutting edges 432. Each knife element 431 has a cross-section which is generally in the shape of a parallelogram or diamond with the related inner cutting edges 432 thereof being evidenced by two of the opposite corners of the parallelogram or diamond. Reinforcing ribs 428 further interconnect knife elements 431.

In operation and use, oblong bore 418 serves as means for securing and pivotally mounting cutting blade 411 to a cutting attachment such as cutting attachment 36 or 276 and also serves as means to permit cutting blade 411 to move longitudinally with respect to the cutting attachment in the event the cutting blade strikes an object during operation of trimming device 35. Such longitudinal movement can reduce damage to cutting blade 411 in these instances by permitting it to move out of harms way. Once contact with the encountered object has ceased, the centrifugal force exerted on cutting blade 411 during operation of the cutting attachment causes the cutting blade to extend radially outwardly again to its outer-most cutting position. Bore 418 also serves to decrease the amount of friction generated heat in mounting portion 413 by expanding the exposed cooling surface area in the bore.

Inner cutting edges 432 created by indentations 427 can be exposed after the outer-most leading cutting edge 421 or 422 of cutting blade 411 has worn out or is no longer cutting effectively. In this regard, the leading knife element 431, which includes the leading cutting edge 421 or 422, can be removed either through wear or through manual separation by slicing or cutting through the related leading outer-most aligned indentations 427 on opposite surfaces 423 and 426. Cutting blade 411 can be used so that either first cutting edge 421 or second cutting edge 422 acts as a leading cutting edge. Changing a cutting edge 421 or 422 from a leading to a trailing cutting edge, or vice versa, is accomplished by turning cutting blade 411 upside down or, where possible, reversing the rotation direction of trimming device 35.

Cutting blade 411, with inner cutting edges 432, can be said to have renewable edges. One of the advantages of cutting blade 411 is increased cutting performance and efficiency. The renewable feature provides for continually sharp edges and increases the cutting life of cutting blade 411. Maintenance in the form of resharpening of the cutting edges of cutting blade 411 is reduced if not eliminated. When compared to existing cutting systems, the use of renewable edge cutting blades such as cutting blade 411 on small electric cordless rotary devices can greatly improve the overall cutting power of these devices. In this manner, the cutting power of these small electric cutting devices can be increased to the level of larger cutting device models, such as small petroleum powered devices. These increases in cutting power and efficiency result in a shortened work time for a given project, reduced pollution and use of natural resources and savings of money.

In another related embodiment shown in cross-section in FIG. 18, a cutting blade 436 is provided which, when viewed in plan, is substantially identical to cutting blade 411. Cutting blade 436 is formed with first and second cutting edges 437 and 438 and first and second spaced-apart generally parallel surfaces 441 and 442. Indentations 443 and reinforcing portions or ribs 446 are provided on first surface 441, but not second surface 442, and serve to create a plurality of knife elements 447 which are each generally triangular in shape when viewed in cross-section. Cutting blade 436 operates in substantially the same manner as cutting blade 411.

In another embodiment of a cutting element similar to cutting blades 411 and 436, a cutting blade 451 formed from an elongate flat planar body 452 having a distal extremity or mounting portion 453 and an adjacent cutting portion 456 is provided (See FIGS. 19 and 20). Mounting portion 453 is provided with a bore 457 which is circular in cross-section and serves as means for pivotally securing and mounting cutting blade 451 to a cutting attachment such as cutting attachment 36 or 276 for use on trimming device 35. Cutting portion 456 has a distal extremity 458 and is formed with first and second opposite cutting edges 461 and 462 which extend along the sides thereof between mounting portion 453 and distal extremity 458, edges 461 and 462 each being generally vee-shaped in cross-section. First and second spaced-apart generally parallel surfaces 463 and 466 extend between edges 461 and 462 in directions generally perpendicular to the edges, with first surface 463 having inclined portions 463a along each side thereof to form the cutting edges. First surface 463 is also provided with a plurality of parallel U-shaped indentations 467 extending diagonally of first and second cutting edges 461 and 462. As illustrated in FIG. 20, indentations 467 form a plurality of parallel knife elements 468 with interconnected inner cutting edges 471 shown as interconnected corners of adjacent triangles.

In operation and use, cutting blade 451 is used in a manner similar to cutting blade 436. It has been found that cutting blades sometimes wear to form a diagonal edge between the leading cutting edge and the distal extremity of the cutting blade. This diagonal edge is at an oblique or inclined angle with respect to the leading cutting edge. Cutting blade 451 can be used in situations which result in this type of wear, with inner cutting edges 471 which generally face the direction of travel of cutting blade 436 serving as additional cutting edges after the leading cutting edge of the leading knife element 468 is worn. The interconnection between opposed inner edges 471 of adjacent knife elements 468 is sufficient to support the knife elements during use of cutting blade 451 without need of reinforcing ribs similar to reinforcing ribs 446. Cutting blade 451 could have indentations on second surface 466 so as to form knife elements similar to those shown in FIG. 17 and be within the scope of the present invention.

Another cutting element suitable for use with cutting attachments 36 or 276 is illustrated in FIG. 21. Cutting blade 476 is formed from an elongate flat planar body 477 having a proximal extremity or mounting portion 478 and a cutting portion 481 which includes a first or central part 482 adjacent mounting portion 478 and a second part 483 adjoining central part 482. Second part 483 includes distal extremity 486 for cutting blade 476. Mounting portion 478 is provided with a bore 487 therethrough which serves as means for securing and pivotally mounting cutting blade 476 to cutting attachments 36 or 276 for use on a trimming device 35. Cutting portion 481 is formed with first and second opposite cutting edges 488 and 491 which extend along the sides thereof between mounting portion 478 and distal extremity 486 and are each generally vee-shaped in cross-section. Cutting portion 481 is further provided with first and second spaced-apart generally parallel surfaces 492 extending between cutting edges 488 and 491 in directions generally perpendicular to the cutting edges.

Second part 483 adjoins first part 482 at an oblique angle and is provided with a plurality of parallel generally vee-shaped indentations 496 situated between first and second cutting edges 488 and 491 and extending along the length of first part 482 in directions parallel to the cutting edges on first surface 492. Spaced-apart parallel reinforcing portions or ribs 497 extend generally transversely across second part 483 and are generally perpendicular to cutting edges 488 and 491.

Cutting blade 476 has aspects similar to cutting blades 376 and 411 and is mounted to a cutting attachment on a trimming device 35 for use and operation substantially similar to those cutting blades.

Cutting elements in the form of cutting strings for use on cutting attachments can have other configurations and be within the scope of the present invention. For example, a cutting string 506 formed from an elongate flexible cutting line 507 is illustrated in cross-section in FIG. 24. Cutting line 507 is made from a suitable material such as high-impact plastic and has a central longitudinal axis 508 shown in end view in FIG. 24. Cutting line 507 is generally rectangular in cross-sectional shape and has at least four substantially continuous first projecting portions 511 extending longitudinally along the cutting line and spaced-circumferentially about the outer radially extremity thereof. Cutting line 507 also has at least four substantially continuous second projecting portions 512 also extending longitudinally along the cutting line and spaced-circumferentially about the outer radial extremity thereof.

First projecting portions 511 are angularly spaced about axis 508 at equivalent intervals of approximately 90° and second projecting portions 512 are angularly spaced about axis 508 at equivalent intervals of approximately 90°, each second projecting portion 512 being located between adjoining first projecting portions 511. Pairs of first projecting portions 511 are diametrically opposed with each other, and pairs of second projecting portions 512 are also diametrically opposed to each other.

Each first projecting portion 511 is formed by two spaced-apart parallel side surfaces 513, which extend generally outwardly from axis 508 to an approximate equivalent radial dimension 516, and an interconnecting outer surface 517 formed by an arc of radial dimension 516. Outer surface 517 serves as the outer radial extremity of each first projecting portion, with each first projecting portion 511 having a radial dimension 516 which is approximately equivalent. Each side surface 513 adjoins outer surface 517 to form a first or outer cutting edge 518 which is an approximate right angle in cross-section. As such, each first projecting portion 511 has two opposite cutting edges 518.

Second projecting portions 512 are recessed radially below outer surface 517 between side surfaces 513 of adjoining first projecting portions 511. Each second projecting portion 512 is formed by two surfaces 521 extending longitudinally along cutting line 507 and radially outwardly from the inner extremity of the side surfaces 513 of said adjoining first projecting portions 511. Surfaces 521 extend outwardly and toward each other and meet to form a second or inner cutting edge 522 which is generally vee-shaped in cross-section. Cutting edge 522 serves as the radial extremity of each second projecting portion 512, with each second projecting portion having an approximately equivalent radial dimension 523 from axis 508 which is less than radial dimension 516 of first projecting portions 511.

Cutting line 507 mounts to cutting attachments 36 and 276 in substantially the same manner as cutting line 162. Cutting string 506 operates in substantially the same manner as cutting string 161. Among other things, first projecting portion outer surface 517 serves to reduce the wear on the inner bore-forming surfaces of grommets 186 and 338. First projecting portion cutting edges 518 act as initial cutting edges, and second projecting portion cutting edges 522 act as secondary or inner cutting edges which are generally exposed after first cutting edges 518 are worn. Cutting line 507 has considerable mass for enhancing its cutting force.

In another embodiment, a cutting string 531 similar to cutting strings 161 and 506 is shown in FIG. 25. Cutting string 531 is formed from an elongate flexible cutting line 532 made from a suitable material such as high-impact plastic and having a central longitudinal axis 533 shown in end view in FIG. 25. Cutting line 532 is generally rectangular in cross-sectional shape and has at least four substantially continuous first and second projecting portions 536 and 537 extending longitudinally along the cutting line which are each spaced-circumferentially about the outer radially extremity thereof. Each set of projecting portions 536 and 537 are angularly spaced about axis 533 at equivalent respective intervals of approximately 90°, each second projecting portion 537 being located between adjoining first projecting portions 536. Pairs of first projecting portions 536 and pairs of second projecting portions 537 are each diametrically opposed to each other.

Each first projecting portion 536 is formed by two opposite side surfaces 538 which extend generally outwardly from axis 533 and toward each other to meet and form a first or outer cutting edge 541 which is generally vee-shaped in cross-section. First cutting edges 541 each have an approximate equivalent radial dimension 542 and serve as the outer radial extremity of first projecting portions 536.

Second projecting portions 537 are recessed radially below cutting edges 541 of first projecting portions 537, and are each formed by two side surfaces 543 which extend radially outwardly from the inner extremity of side surfaces 538 of adjoining first projecting portions 536 and toward each other to meet and form a second or inner cutting edge 546 which is generally vee-shaped in cross-section. Second cutting edges 546 each have an approximate equivalent radial dimension 547 from axis 533 which is less than radial dimension 542 of first projecting portions 536, and serve as the outer radial extremity of second projecting portions 537.

Cutting line 532 mounts to cutting attachments 36 and 276 in substantially the same manner as cutting line 162. Cutting string 531 operates in a manner similar to cutting string 161, with first projecting portion cutting edges 541 acting as initial cutting edges and second projecting portion cutting edges 546 acting as secondary or inner cutting edges which are generally exposed after first cutting edges 541 are worn.

In another embodiment, a cutting string 551 similar to cutting string 531 and formed from an elongate flexible cutting line 552 made from a suitable material such as high-impact plastic is provided (See FIG. 26). Cutting line 552 has a central longitudinal axis 553, shown in end view in FIG. 26, and is generally rectangular in cross-sectional shape. Cutting line 552 has at least four substantially continuous first and second projecting portions 556 and 557 extending longitudinally along the cutting line which are each spaced-circumferentially about the outer radially extremity thereof. Each set of projecting portions 556 and 557 are angularly spaced about axis 553 at equivalent respective intervals of approximately 90°, each second projecting portion 557 being located between adjoining first projecting portions 556. Pairs of first projecting portions 556 and pairs of second projecting portions 557 are each diametrically opposed to each other.

Each first projecting portion 556 is generally rectangular-shaped in cross-section and is formed by two generally perpendicular first side surfaces 558 which extend generally outwardly from axis 553 and away from each other and two second side surfaces 561, each perpendicularly adjoining the related first side surface 558, which extend generally outwardly from axis 553 and toward each other. Second side surfaces 561 meet at an approximate right angle to form a first or outer cutting edge 562. First cutting edges 562 each have an approximate equivalent radial dimension 563 and serve as the outer radial extremity of first projecting portions 556. Each first side surface 558 is generally parallel to the opposed first side surface 558 of the adjoining first projecting portion 556, and joins its related second side surface 561 to form a second cutting edge 566. Second side surfaces 561 of adjoining first projecting portions are generally coplanar and form a side of cutting line 552.

Second projecting portions 557 are recessed radially below second side surfaces 561 and between opposed first side surfaces of adjoining first projecting portions 556. Each second projecting portion 557 is formed by two opposite generally coplanar base surfaces 567, which adjoin the inner extremity of opposed first side surfaces 558 and extend toward each other, and two opposite projecting surfaces 568, which extend generally outwardly from axis 553 at an oblique angle from the related base surface 567. Projecting surfaces 568 extend toward each other to meet at an approximate right angle and form a third cutting edge 571. Third cutting edges 571 each have an approximate equivalent radial dimension 572 from axis 553 which is less than radial dimension 563 of first projecting portions 556, and serve as the outer radial extremity of second projecting portions 557.

Cutting line 552 mounts to cutting attachments 36 and 276 in substantially the same manner as cutting line 162. Cutting string 551 operates in a manner similar to cutting string 531, but has three sets of cutting edges which are exposed sequentially as cutting line 552 is worn. First projecting portion cutting edges 562 act as initial cutting edges and second cutting edges 566 act as secondary cutting edges. Second cutting edges 566 generally become operative after first cutting edges 562 and cutting line 552 have been worn. Third cutting edges 571 formed on projecting portion 557 act as tertiary or inner cutting edges which are generally exposed after first and second cutting edges 562 and 566 are worn.

Cutting strings can have embodiments with noncontinuous first projecting portions for reducing fraying of the cutting line during operation of the trimming device and be within the scope of the present invention. A portion of a cutting string 581 substantially similar to cutting string 531 is shown in FIGS. 27 and 28. Cutting string 581 is formed from an elongate flexible cutting line 582 extending longitudinally along a central longitudinal axis 583 and made from a suitable material such as high-impact plastic. Cutting line 582 includes first and second projecting portions 584 and 586. First projecting portions 584 are each formed from adjoining first and second side surfaces 587 substantially identical to side surfaces 538, and second projecting portions 586 are each formed from adjoining first and second side surfaces 588 substantially identical to side surfaces 543. Side surfaces 587 and 588 each extend longitudinally along cutting line 582 and generally radially outwardly from longitudinal axis 583 and meet to form respective first and second cutting edges 591 and 592.

First projecting portions 584 are provided with a plurality of generally parallel grooves 593 spaced longitudinally along cutting line 582 and extending generally angularly about axis 583 across and through the first projecting portions between first and second longitudinal side surfaces 587 (See FIG. 28). More specifically, angular grooves 593 extend perpendicularly between first and second side surfaces 587 and separate first projecting portions 584 into cutting segments 596. Grooves 593 generally extend no deeper than the bottom of first projecting portions 584. In addition, the grooves are equivalently spaced on each first projecting portion 584 and offset with respect to grooves 593 formed on the other first projecting portions 584 so as not to substantially weaken cutting line 582. In general, only an approximate one-half inch of the end of cutting strings are typically used in cutting operations. Grooves 593 can be spaced longitudinally from approximately one-quarter to one and one-half inch apart.

In operation and use, grooves 593 provided on cutting line 602 can reduce fraying of the cutting line by facilitating separation of frayed cutting segments 596 from the cutting line. For example, if a first projecting portion 584 were to split from the balance of cutting line 602 and commence fraying of the cutting line, the split, upon reaching groove 593, would cause the frayed cutting segment 596 to separate from the cutting line. In this manner, further fraying would be hindered by groove 593, the commencement of frays being more difficult than the propagation thereof. Severing frayed cutting segments 596 also serves to better expose for use second cutting edges 592 on second projecting portions 586 by facilitating the separation of frayed cutting segments 596.

In other embodiments of cutting strings similar to cutting strings 581, a cutting string 601 made from an elongate flexible cutting line 602 extending longitudinally along a central longitudinal axis 603 is provided (See FIG. 29). Cutting line 602 is made from a suitable material such as high-impact plastic, and includes first and second projecting portions 606 and 607 substantially identical to projecting portions 584 and 586 discussed above. More particularly, portions 606 are formed from adjoining first and second side surfaces 608 which meet at first cutting edges 611 and portions 607 are formed from adjoining first and second side surfaces 612 which meet at second cutting edges 613.

First and second projecting portions 606 and 607 extend longitudinally along axis 603 in a spiral configuration. In addition, portions 606 and 607 are provided with a plurality of generally annular grooves 616 which are substantially similar to grooves 593 but extend completely around the circumference of cutting line 602 through projecting portions 606 and 607.

In operation and use, cutting line 602 with spiraled cutting edges 611 and 613 has been found to be a more aerodynamic cutting line which is quieter in operation than cutting lines with longitudinally straight cutting edges. The spiraled configuration causes cutting string 601 to angularly rotate about axis 603 during use thereof. Such rotation also increases the cutting effectiveness and life of the cutting string by avoiding concentrated cutting on any particular cutting edge 611 or 613. Grooves 616 reduce fraying in first and second projecting portions 606 and 607 in the same manner as grooves 593 reduce fraying in first projecting portions 584.

Cutting attachments of the present invention can be formed with cutting elements integral therewith such as cutting blades similar to those discussed above. A generally planar cutting attachment 626 for use with a vegetation cutting device such as trimming device 35 is shown in FIG. 30. Cutting attachment 626 is formed from a thin relatively rigid body 627 made of a high strength plastic and having first or top and second or bottom generally parallel opposite surfaces 628. Body 627 includes a central or coupling portion 631 centered on an axis of rotation 632 shown in end view in FIG. 30.

Coupling means adapted to couple body 627 to trimming device 35 to cause rotation about axis 632 is carried by coupling portion 631 and includes a centrally disposed hole or opening 633 in the coupling portion which is generally circular in cross-section. Opening 633 has a pair of slots 636 diametrically disposed on opposite sides of the opening which are part of a keyway system 637 substantially identical to keyway system 196. The coupling means further includes adapter assembly 198 for mounting cutting attachment 626 to drive shaft 39 of trimming device 35 in the manner discussed above.

A plurality of spaced apart radially extending cutting elements are carried by body 627 for cutting vegetation as the body rotates about axis 632. In this regard, body 627 includes three arms 642 integral therewith which are symmetrically disposed about axis of rotation 632. Arms 642 have proximal and distal end portions 643 and 646 and first and second generally parallel opposite sides 647 which extend therebetween. Proximal end portions 643 are joined to coupling portion 631 so that arms 642 extend radially outwardly from the coupling portion with respect to axis 632.

Cutting elements in the form of cutting blades 651 are joined to arm distal end portions 646 and extend radially outwardly from axis 632 in linear alignment with the related arm 642. Each cutting blade 651 is substantially identical to cutting portion 416 of cutting blade 411 discussed above, and is formed from an elongate flat planar body 652 with first and second opposite cutting edges 653 and 656 extending along the sides thereof and first and second spaced-apart generally parallel surfaces 657 extending between the edges in directions generally perpendicular thereto. Cutting blade body 652 has a cross-sectional shape substantially similar to the shape shown in FIG. 17 and has a plurality of parallel vee-shaped indentations 658 formed on each surface 657 and a plurality of spaced-apart parallel reinforcing portions or ribs 661 extending generally transversely of cutting edges 653 and 656 on each surface 657. Indentations 658 serve to partition cutting blade body 652 into a plurality of knife elements 662.

Arms 642 are each formed with a yieldable portion or flex section between proximal and distal end portions 643 and 646 created by two spaced-apart parallel slots 663 which extend through surfaces 628 and are longitudinally aligned with sides 647. Slots 663 form two opposite outer and one central narrow support portions 666 in each arm 642, with each central support portion 666 having aligned and opposite facing bumps 667 formed thereon and extending into slots 663 on either side thereof.

In operation and use, cutting attachment 626 with cutting blades 651 thereon is mounted on trimming device 35 in substantially the same manner as cutting attachments 36 and 276. Cutting blades 651 operate in substantially the same manner as cutting blades 411. Slots and support portions 663 and 666 permit arm distal end portions 646 and cutting blades 651 mounted thereon to move relative to arm proximal end portion 643 in a plane defined by first and second sides 647 when an object is encountered by the cutting blades. More particularly, slots 663 permit narrow support portions 666 to pivot in alignment with respect to proximal end portion 643. The narrow configuration of support portions 666 permit arms 642 and cutting blades 651 to absorb a considerable amount of the damaging shock forces experienced by the cutting blades on such an impact. The engagement of bumps 667 with the two outer support portions 666 limit this pivotal movement so as to avoid structurally damaging bending of arms 642.

The cutting attachments of the present invention can be adapted for use with cutting devices other than trimming devices, such as lawn mowers, edgers and leaf shredders, and be within the scope of the present invention. More specifically, the cutting attachments can be used with conventional lawn mowers, not shown in the drawings, having elongate blades rotating about an axis substantially perpendicular to the ground. For this purpose, a cutting attachment 671 formed from a thin elongate relatively rigid body 672 is provided (See FIGS. 31 and 32). Cutting attachment body 672 is made of a high strength plastic and has first or top and second or bottom generally parallel opposite surfaces 673. Body 672 includes a central or coupling portion 676 centered on an axis of rotation 677.

Coupling means adapted to couple body 672 to a lawn mower to cause rotation about axis 677 is carried by coupling portion 676 and includes a centrally disposed hole or opening 678 in the coupling portion which is generally circular in cross-section. Opening 678 has a pair of slots 681 diametrically disposed on opposite sides of the opening which are part of a keyway system 682 substantially identical to keyway system 196. Cutting attachment 671 can carry other coupling means for rotatably coupling it to a lawn mower in a manner known to those skilled in the art and be within the scope of the present invention.

A plurality of spaced apart radially extending cutting elements are carried by body 672 for cutting vegetation as the body rotates about axis 677. In this regard, body 672 includes two arms 683 integral therewith which are diametrically opposed about axis of rotation 677. Arms 683 have proximal and distal end portions 686 and 687 and first and second generally parallel opposite sides 688 which extend therebetween. Proximal end portions 686 are joined to coupling portion 676 so that arms 683 extend radially outwardly from the coupling portion with respect to axis 677.

Cutting elements in the form of cutting blades 411 shown in FIG. 16 are joined to arm distal end portions 687 and extend radially outwardly from axis 632. Means for pivotly mounting and coupling each cutting blade 411 to distal end portion 687 includes a bolt 691 which extends through bore 418 in cutting blade 411 and a bore 692 extending through surfaces 673 of the distal end portion. A nut 693 is threadedly connected to the end of bolt 691 for securing it within bores 418 and 692.

Although mounted to a lawn mower instead of a cutting device such as trimming device 35, cutting attachment 671 operates in substantially the same manner as cutting attachment 626. Cutting blade 411 operates in substantially the same manner when mounted to cutting attachment 671 as when mounted to cutting attachment 36 or 276 as discussed above.

A cutting attachment adapted for use with a lawn mower can have other configurations and be within the scope of the present invention. Another embodiment of such a cutting attachment is illustrated in FIGS. 33 and 34 where a cutting attachment 701 similar to cutting attachment 671 is shown. Cutting attachment 701 is formed from a thin elongate relatively rigid body 702 made of a high strength plastic and having top and bottom generally parallel opposite surfaces 703 and a coupling portion 706 centered on an axis of rotation 707 shown in end view in FIG. 33. Coupling means adapted to couple body 702 to a lawn mower to cause rotation about axis 707 includes a centrally disposed opening 708 in the coupling portion which has a pair of slots 711 diametrically disposed on the opposite sides thereof. Slots 711 are part of a keyway system 712 substantially identical to keyway system 196.

Cutting attachment body 702 includes two arms 713 integral therewith which are diametrically opposed about axis of rotation 707. Arms 713 have proximal and distal end portions 716 and 717 and first and second generally parallel opposite sides 718 which extend therebetween. Proximal end portions 716 are joined to coupling portion 706 so that arms 713 extend radially outwardly from the coupling portion with respect to axis 707. Arms 713 are each formed with a yieldable portion between proximal and distal end portions 716 and 717 created by two spaced-apart parallel slots 721 which extend through surfaces 703 and are longitudinally aligned with sides 718. Slots 721 form two opposite outer and one central narrow support portions 722 in each arm 713, with each central support portion 722 having aligned and opposite facing bumps 723 formed thereon and extending into slots 721 on either side thereof.

Cutting elements in the form of cutting blades 731 are joined at oblique angles to arm distal end portions 717 and extend outwardly from axis 707. Each cutting blade 731 is substantially identical to the cutting portion of cutting blade 436 discussed above, and is formed from an elongate flat planar body 732 with first or leading and second or trailing opposite cutting edges 733 and 736 extending along the sides thereof and first and second spaced-apart generally parallel surfaces 737 extending between the edges in directions generally perpendicular thereto. Edges 733 and 736 are inclined with respect to the respective arm 713 away from the direction of travel of cutting attachment 701. Cutting blade body 732 has a cross-sectional shape substantially similar to the shape shown in FIG. 17 and has a plurality of parallel vee-shaped indentations 738 formed on one surface 737 thereof and a plurality of spaced-apart parallel reinforcing portions or ribs 741 extending generally transversely of cutting edges 733 and 736 on said surface 737. Indentations 738 serve to partition cutting blade body 732 into a plurality of knife elements 742. Cutting blade body 732 has a thin fin or airlift 743 mounted to trailing edge 736 near the end thereof, airlift 743 being mounted at an oblique angle to surfaces 737 and extending generally upwardly therefrom.

Cutting attachment 701 operates on a lawn mower in substantially the same manner as cutting attachment 626 operates on trimming device 35. Inclined cutting blades 731 thereon serve a similar function as cutting blade 476 discussed above. Aerodynamic airlift 743, known to those skilled in the art, assists in keeping cutting blades 731 close to the ground.

Adapter assembly 198 can have other configurations and be within the scope of the present invention. For example, a sleeve element 751 can be provided which is substantially identical to sleeve element 201 and has a lower end portion 752 with an end 753 (See FIG. 37). Sleeve element 751 is provided with a centrally disposed bore 756 which extends longitudinally therethrough and opens into a recess or receptacle 757 provided in end 753. Bore 756 is adapted to snugly receive drive shaft 39 and is so configured and dimensioned. Receptacle 757 is formed by a planar stop surface 758 which is generally parallel with end 753, an inner surface 761 which generally perpendicularly adjoins stop surface 758 and extends toward end 753, a shoulder 762 which generally perpendicularly adjoins inner surface 761 and is generally parallel with end 753, and an inner surface 763 which generally perpendicularly adjoins and interconnects shoulder and end 762 and 753.

Receptacle 757 has upper and lower portions 757a and 757b. Upper portion 757a is generally formed by stop and inner surfaces 758 and 761, with inner surface 761 being cross-sectionally configured and dimensioned to non-rotatably receive a hexagonal securement bolt head. Lower portion 757b is generally formed by shoulder and inner surface 762 and 763, with inner surface 763 being cross-sectionally configured and dimensioned to non-rotatably receive a larger bolt head than that received by upper portion inner surface 761.

In operation and use, adapter assembly 198 with sleeve element 751 permits the adapter assembly and the cutting attachments described herein to be easily used with trimming devices 35 having securement bolts with varying head sizes. Sleeve element 751 can be simply adapted to accommodate additional bolt head sizes by utilizing a bolt adapter means therewith similar to socket 225 discussed above.

In another embodiment of a cutting or trimmer line having renewable edges for use on a rotating string trimmer, a cutting or trimmer string 801 formed from an elongate flexible cutting line 802 is provided (see FIG. 38). Cutting line 802 is made by any suitable means such as extrusion from a suitable material such as high-impact plastic and has a central longitudinal axis 803 shown in end view in FIG. 38. Trimmer string 801 is generally star-shaped in cross-section and has five sets 806 of outer cutting edges spaced circumferentially about axis 803 at approximately equivalent intervals of 72°. Each set 806 of outer edges includes first and second outermost cutting portions or elements 807 formed with sharp cutting edges 808 at the radial extremities thereof. Cutting elements 807 each have an approximately equivalent radial dimension equal to the distance between respective edge 808 and axis 803. Sets 806 also include a third cutting portion or element 812 disposed in a recess 813 formed between outermost cutting elements 807. Third or inner cutting elements 812 are each formed with a sharp edge 814 and each have a radial dimension 816 less than radial dimensions 811.

Trimmer string 801 further includes five innermost cutting portions or elements 820 spaced circumferentially about axis 803 at approximately equivalent intervals of 72°. Each innermost cutting element 820 is disposed in a recess 821 formed between each set 806 of outer edges. Cutting elements 820 are each formed with a cutting edge 822 at the radial extremity thereof and each have a radial dimension 823 less than radial dimensions 811 and 816.

The equivalent spacing about axis 803 of cutting elements 807, 812, and 820 serves to balance trimmer string 801 during use. Although the cutting elements formed in cutting line 802 are shown as being generally triangular in cross section, it should be appreciated that these cutting elements can have other configurations and be within the scope of the present invention.

In operation and use, the pronounced sets 806 of outer edges formed on cutting line 802 serve as initial cutting edges. After outermost cutting elements 807 have been worn, inner cutting elements 812 therebetween are exposed and serve as fresh cutting edges. Further use of cutting string 801 causes cutting elements 807 and 812 to wear radially inwardly so that cutting edge 822 of innermost cutting elements 820 are exposed and serve as yet an additional fresh set of cutting edges.

A cross-sectional view of another embodiment of the string trimmer line of the present invention is illustrated in FIG. 39. Cutting or trimmer string 831 shown therein is formed from an elongate flexible cutting line 832 made from a suitable material such as high-impact plastic and has a central longitudinal axis 833. Cutting string 831 is generally X-shaped in cross-section and has four outer projecting portions 836 which extend substantially continuously along the length of cutting line 832 and are circumferentially-spaced about axis 833 thereof at approximately equivalent intervals of 90°. Each projecting portion 836 extends radially outwardly from axis 833 and is generally square in cross-sectional shape.

More specifically, projecting portions 836 are provided with first and second spaced-apart outermost cutting portions or elements 837 formed in part by corners 838 of projecting portions 836 and having opposed corners or edges 841 formed by a recess 842 provided in the center of the radial extremity thereof. Corners 838 and edges 841 can each serve as cutting edges and have respective radial dimensions 843 and 844 as shown in FIG. 39. Radial dimension 843 of cutting edge 838 is slightly larger than radial dimension 844 of cutting edge 841 and, as a result, cutting edges 838 are the outermost cutting edges of trimmer string 831. It should be appreciated that each cutting element 837, with cutting edges 838 and 841 thereof, can be viewed as a single cutting edge and be within the scope of the present invention.

Each projecting portion 836 is provided with a cutting portion or element 847 disposed in the center of recess 842 between cutting elements 837. Cutting elements 847 are each formed with a cutting edge 848 at the radial extremity thereof and have a radial dimension 851 which is less than radial dimensions 843 and 844.

Cutting string 831 further includes four innermost cutting portions or elements 852 which are circumferentially spaced about axis 833 at approximately equivalent intervals of 90°. In this manner, a cutting element 852 is disposed between each projecting portion 836 in a recess 853 therebetween. Cutting elements 852 are each generally triangular in cross-sectional shape and have a cutting edge 854 at the radial extremity thereof and a radial dimension 855 which is less than radial dimensions 843, 844 and 851.

As can be seen, cutting string 831 has four sets of cutting edges for generally sequentially engaging the vegetation being trimmed as the cutting string wears. Each set of cutting edges consists of four cutting edges and the cutting edges of each sequential set have a radial dimension less than the cutting edges of the previous sequential set of cutting edges.

In operation and use, the relatively massive projecting portions 836 of cutting string 831 can serve as radially outer cutting edges, with edges 838, 841 and 848 serving to sequentially provide the cutting portions with a sharp cutting edge. Innermost cutting edges 854 are exposed once projecting portions 836 have worn to a radial dimension which approximates radial dimension 851 of innermost cutting elements 852.

Yet another embodiment of the trimmer line of the present invention is illustrated in FIG. 40 which shows a cutting or trimmer string 861 formed from an elongate flexible cutting line 862 made from a suitable material such as high-impact plastic and having a central longitudinal axis 863. Trimmer string 861 is generally triangular in cross-sectional shape, being formed with at least two sets or clusters of outer cutting edges, and as shown in FIG. 43 three clusters 866 of outer cutting edges, spaced circumferentially about axis 863 at approximately equivalent intervals of 120°. Each cluster 866 includes first and second outermost cutting portions or elements 867 formed substantially triangular in cross-sectional shape with sharp cutting edges 868 at the radial extremities thereof. Cutting elements 867 each have an approximately equivalent radial dimension 871. Clusters 866 further include a third cutting portion or element 872 disposed in a recess 873 formed between outermost cutting elements 867. Third or inner cutting elements 872 are each formed substantially triangular in cross-sectional shape with a sharp edge 876 and each have a radial dimension 877 less than radial dimension 871.

Outwardly projecting clusters 866 form a recess 881 between each cluster and trimmer string 861 is further provided with at least two clusters of inner cutting edges, and as shown in FIG. 40 three clusters 882 of inner cutting edges in recesses 881. More specifically, clusters 882 are spaced circumferentially about axis 863 at approximately equivalent intervals of 120°, a cluster 882 disposed in each recess 881 between adjacent clusters 866.

Each cluster 882 has a shape which generally approximates a truncated triangle and is formed with first and second spaced apart cutting portions or elements 886 formed substantially triangular in cross-sectional shape with sharp cutting edges 887 at the radial extremities thereof. Cutting elements 886 each have an approximately equivalent radial dimension 888 which is less than radial dimensions 871 and 877. Clusters 882 each further include a third or innermost cutting portion or element 891 disposed in a recess 892 formed between cutting elements 886. Innermost cutting elements 891 are each formed substantially triangular in cross-sectional shape with a sharp edge 893 and each have a radial dimension 896 less than radial dimension 888.

In operation and use, trimmer string 861 has inner and outer clusters 866 and 882 of cutting edges for extending the cutting life thereof. As seen above, each cluster 866 is initially provided with two cutting portions or edges 868 so that trimmer string 861 has six initial cutting edges. As these six cutting edges are worn away, a third cutting element 872 in cluster 866 is exposed to provide a fresh cutting edge. Further wear of trimmer string 861 exposes inner clusters 882 which are also provided with an aggregate of six initial cutting elements 886. Following wear of cutting elements 886, the three innermost cutting elements 891 are exposed so as to further extend the cutting life of trimmer string 861. As can be seen, trimmer string 861 is provided with four sets of cutting edges which are exposed sequentially to provide a cutting string with a significant working life.

Yet another embodiment of a cutting or trimmer line having renewable edges is illustrated in FIG. 41. Cutting or trimmer string 901 shown therein is formed from an elongate flexible cutting line 902 made from a suitable material such as high-impact plastic and has a central longitudinal axis 903. Cutting string 901 is generally triangular in cross-section and is provided with clusters 906 of outer cutting edges substantially identical to outer clusters 866 of trimmer string 861. Briefly, clusters 906 have first and second spaced apart outermost cutting portions or elements 907 formed substantially triangular in cross-sectional shape with sharp cutting edges 908 at the radial extremities thereof. Cutting elements 907 each have an approximately equivalent outermost radial dimension 911. Clusters 906 further include a recess 912 formed in part by cutting elements 907 and are provided with a third or inner cutting portion or element 913 therein. These inner cutting elements 913 are each formed substantially triangular in cross-section with a sharp edge 916 and each have an outermost radial dimension 917 less than radial dimension 911 of cutting elements 907. A recess 918 is provided between each cluster 906. The significant separation between each cluster 906 provided on cutting string 901 facilitates its manufacture.

In operation and use, cutting string 901 is provided with six initial cutting edges 908. After these cutting edges are worn away, inner cutting edges 916 are exposed to further extend the life of cutting string 901.

Although the cutting strings described in this application are described for use with conventional rotating string trimmers, these cutting strings can be used with other vegetation cutting devices such as lawnmowers and be within the scope of the present invention.

Another cutting attachment 921 of the present invention is illustrated in FIG. 42. Cutting attachment 921 is substantially similar to cutting attachments 36 and 276 described above and is designed as a basic unit for use with cutting blades only. Cutting attachment 921 has a central wall portion 922 substantially similar to central wall portion 281 of cutting attachment 276 and an outer wall portion 923 substantially similar to outer wall portion 47 of cutting attachment 36. Outer wall portion 923 has a lower surface (not shown) substantially similar to the lower surface of outer wall portion 47, but does not include an annular ridge similar to annular ridge 88 of cutting attachment 36.

Central and outer wall portions 922 and 923 form an outer cavity 926 which has a plurality of ribs, and as shown in FIG. 42 three radially extending ribs 927, which extend between the central and outer wall portions. Ribs 927 are each provided with two radially extending recesses 928 therein for reducing the weight and mass thereof. In this manner, each rib 927 consists of three rib portions 927a. Ribs 927 each further include a boss portion 931 adjacent outer wall portion 923 which has a bore 932 extending therethrough for permitting a cutting blade to be attached to cutting attachment 921.

Another embodiment of a cutting element is shown in FIG. 43 in which a cutting blade 941 substantially similar to cutting blades described above is provided. Cutting blade 941 is formed from an elongate flat planar body of a high-impact plastic having mounting and cutting portions 942 and 943. Cutting portion 943 includes first and second spaced apart generally parallel surfaces 946 extending between opposite cutting edges 947 and a rounded end in the form of a cutting edge 948 which adjoins edges 947. Edges 947 and 948 are each formed with U shaped serrations 951 therein which form teeth 952. Serrations and teeth 951 and 952 enhance the cutting action of cutting blade 941.

Another cutting blade 961 of the present invention is shown in FIG. 44. Cutting blade 961 is substantially similar to cutting blade 941 except that cutting portion 962 thereof tapers as it extends outwardly from mounting portion 963. Cutting portion 962 has opposite first and second generally parallel surfaces 966 which extend between opposite cutting edges 967. Cutting edges 967 taper toward each other and each adjoin a rounded end in the form of end cutting edge 968. Edges 967 and 968 are each formed with U shaped serrations 971 separated by cutting teeth 972. Cutting blade 961 operates in substantially the same manner as cutting blade 941.

It is apparent from the foregoing that a new and improved cutting attachment which has a unitary lightweight body with a self-cleaning shape has been provided. The cavities therein are formed from generally smooth and outwardly inclined surfaces to inhibit weeds from becoming caught therein. In addition, the cutting attachment has a skid plate and a cover plate accessory can be mounted thereon. The cutting attachment can be readily coupled to various types of cutting devices.

Improved cutting elements in the form of cutting blades and cutting strings are provided for use with the cutting attachment. In one embodiment, a cutting blade is provided with an inner cutting edge which can be exposed for use after the outermost leading cutting edge has worn. In other embodiments, cutting blades are provided with serrated cutting edges and aerodynamic configurations. An improved structure is provided for yieldably mounting cutting blades to a cutting attachment.

A cutting string is provided which does not cause significant wear to the cutting attachment and which includes an inner cutting edge for use after the outermost cutting edge has worn. In other embodiments, cutting strings are provided which inhibit fraying thereof and which are aerodynamically spiraled in longitudinal configuration.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, and to thereby enable others skilled in the art to best utilize the invention and various embodiments with various modifications as are suited to the particular use contemplated. It is intended that the scope of the invention be defined by the claims appended hereto and their equivalents.

What is claimed is:

1. A cutting assembly for use with a cutting device to trim vegetation comprising a lightweight unitary one piece rigid body having an axis of rotation extending in a first direction toward the vegetation to be trimmed and in an opposite second direction away from the vegetation to be trimmed, the rigid body including a central wall portion extending in the first direction to an extremity, the central wall portion having an inner surface which forms a cavity centered on the axis of rotation and opening at the extremity in the first direction, coupling means adapted to couple the rigid body to the cutting device to cause rotation of the rigid body about the axis of rotation carried by the central wall portion, the coupling means being recessed entirely within the cavity, the rigid body including a circular outer wall portion adjoining the central wall portion and extending outwardly from the extremity of the central wall portion, the circular outer wall portion having first and second parts and an outer periphery, the first part being provided with a planar surface which extends perpendicularly of the axis of rotation from the extremity of the central wall portion and the second part being provided with an outer surface adjoining the planar surface of the first part which extends 360° around the axis of rotation and curves arcuately toward the second direction to the outer periphery, the rigid body having a radius, the planar surface of the first part extending radially for at least 20% of the radius of the rigid body and the outer surface of the second part extending radially for at least 10% of the radius of the rigid body, the rigid body being free of any protuberances extending in the first direction beyond the planar surface of the first part, the planar surface of the first part and the outer surface of the second part serving as a skid plate surface which has sufficient circumferential continuity to inhibit snagging on objects as the rigid body rotates about the axis of rotation, at least one cutting element and fastening means for mounting the at least one cutting element to the circular outer wall portion so that the cutting element extends outwardly from the rigid body above the outer surface for trimming the vegetation as the rigid body rotates about the axis of rotation.

2. A cutting assembly as in claim 1 wherein said at least one cutting element includes a plurality of cutting blades and wherein said fastening means includes means for mounting the cutting blades on the outer wall portion so that the cutting blade extends outwardly from said axis of rotation.

3. A cutting assembly as in claim 2 wherein said cutting blades each comprise an elongate body having proximal and distal extremities and having upper and lower substantially planar surfaces and first and second adjoining side portions extending between the proximal and distal extremities, at least one of the first and second side portions in cross section having a decreasing thickness in a transverse direction to provide at least one inclined surface terminating in a cutting edge extending between the proximal and distal extremities, the inclined surface having longitudinally spaced apart recesses therein to form sharp teeth-like protuberances and wherein said fastening means includes means for mounting the proximal extremity of each elongate body to the body for permitting swingable movement of the cutting blades relative to the body.

4. A cutting assembly as in claim 1 wherein said central wall portion extends outwardly from said axis of rotation as the central wall portion extends in the first direction.

5. A cutting assembly as in claim 4 wherein said central wall portion has a substantially smooth inner surface.

6. A cutting assembly as in claim 1 wherein said central wall portion has a substantially smooth outer surface and said outer wall portion has a substantially smooth inner surface opposed to the outer surface of the central wall portion for forming an additional cavity which opens in the second direction.

7. A cutting assembly as in claim 1 wherein said at least one cutting element includes a cutting string and wherein said fastening means includes means for mounting the cutting string on the outer wall portion in a direction extending outwardly from said axis of rotation.

8. A cutting assembly as in claim 7 wherein said outer periphery is formed with an annular protection ring which extends outwardly from the outer surface of the outer wall portion adjacent the outwardly extending cutting string, the protection ring serving to protect the cutting string during operation of the cutting device.

9. A cutting assembly as in claim 1 wherein said coupling means includes a recess in the cavity formed by an inner surface cross-sectionally configured to non-rotatably receive a bolt head.

10. A cutting assembly as in claim 9 wherein said inner surface includes a plurality of surface portions extending parallel to said axis of rotation and at an oblique angle relative to each other.

11. A cutting assembly as in claim 9 together with a socket element having an outer surface cooperatively configured for non-rotatable disposition in said recess, the socket element hen provided with a recess formed by an inner surface cross-sectionally configured to non-rotatably receive a bolt head of a different type from said first-named bolt head.

12. A cutting assembly for use with a vegetation cutting device to trim vegetation comprising a lightweight unitary one piece rigid body having an axis of rotation extending in a first direction toward the vegetation to be trimmed and in an opposite second direction away from the vegetation to be trimmed, the rigid body including a central wall portion extending in the first direction, the central wall portion having a substantially smooth inner surface extending around the axis of rotation which forms a first cavity centered on the axis of rotation and opening in the first direction, coupling means adapted to couple the rigid body to the cutting device to cause rotation of the rigid body about the axis of rotation, the coupling means being recessed entirely within the first cavity, the rigid body including a circular outer wall portion adjoining the central wall portion having an outer periphery and a first part which extends outwardly from the central wall portion and a second part which extends from the first part toward the second direction to the outer periphery, the outer wall portion having an outer surface extending 360° around the axis of rotation which curves arcuately toward the second direction to the outer periphery and serves as a skid surface as the rigid body rotates about the axis of rotation, the central wall portion having a substantially smooth outer surface and the outer wall portion having a substantially smooth inner surface for forming a plurality of second cavities which open in the second direction, the plurality of second cavities being separated by a plurality of ribs extending from the outer surface of the central wall portion to the inner surface of the outer wall portion, at least one cutting element and fastening means for mounting the at least one cutting element to the rigid body so that the cutting element extends outwardly from the rigid body above the outer surface of the outer wall portion trimming the vegetation as the rigid body rotates about the axis of rotation.

13. A cutting assembly as in claim 12 wherein said inner surface of the central wall portion extends outwardly and in the first direction as the central wall portion extends in the first direction.

14. A cutting assembly as in claim 12 wherein said at least one cutting element includes a plurality of cutting blades and wherein said fastening means includes means for mounting the cutting blades to the outer wall portion.

15. A cutting assembly as in claim 12 wherein said at least one cutting element includes a plurality of cutting elements and wherein said fastening means includes means for mounting the plurality of cutting elements to the plurality of ribs.

16. A cutting assembly as in claim 15 wherein said plurality of cutting elements are a plurality of cutting blades.

17. A cutting assembly as in claim 12 wherein the inner surface of the central wall portion extends outwardly from the axis of rotation as it extends in the first direction.

18. A cutting assembly for use with a cutting device to trim vegetation comprising a lightweight unitary one piece rigid body having an axis of rotation extending in a first direction toward the vegetation to be trimmed and in an opposite second direction away from the vegetation to be trimmed, the rigid body including a mounting portion adapted to couple the rigid body to the cutting device to cause rotation of the rigid body about the axis of rotation and a circular outer wall portion adjoining the mounting portion and extending outwardly from the axis of rotation, the outer wall portion having an outer periphery and first and second parts, the first part having a smooth planar surface which extends outwardly from the axis of rotation and the second part having an outer surface adjoining the planar surface of the first part which extends 360° around the axis of rotation and curves arcuately toward the second direction to the outer periphery, the rigid body having a radius, the planar surface of the first part extending radially for at least 20% of the radius of the rigid body and the outer surface of the second part extending radially for at least 10% of the radius of the rigid body, the rigid body being free of any protuberances extending in the first direction beyond the planar surface of the first part, the planar surface of the first part and the outer surface of the second part serving as a skid surface as the rigid body rotates about the axis of rotation, the mounting portion having an outer surface and thee outer wall portion having an inner surface for forming a cavity opening in the second direction, at least one cutting element and fastening means for mounting the at least one cutting element to the rigid body so that the cutting element extends outwardly from the rigid body above the skid surface for trimming the vegetation as the rigid body rotates about the axis of rotation.

19. A cutting assembly as in claim 18 wherein said at least one cutting element includes a plurality of cutting blades and wherein said fastening means includes means for mounting the cutting blades on the outer wall portion in a direction extending outwardly from said axis of rotation.

20. A cutting assembly as in claim 19 wherein said cutting fastening means includes means for mounting the cutting blades atop the outer wall portion.

21. A cutting assembly as in claim 19 wherein said cutting blades each comprise an elongate body having proximal and distal extremities and having upper and lower substantially planar surfaces and first and second adjoining side portions extending between the proximal and distal extremities, at least one of the first and second side portions in cross section having a decreasing thickness in a transverse direction to provide at least one inclined surface terminating in a cutting edge extending between the proximal and distal extremities, the inclined surface having longitudinally spaced apart recesses therein to form sharp teeth-like protuberances and wherein said fastening means includes means for mounting the proximal extremity of each elongate body to the body for permitting swingable movement of the cutting blades relative to the body.

22. A cutting assembly for use with a cutting device to trim vegetation comprising a lightweight unitary one piece rigid body having an axis of rotation extending in a first direction toward the vegetation to be trimmed and in an opposite second direction away from the vegetation to be trimmed, the rigid body including a mounting portion adapted to couple the rigid body to the cutting device to cause rotation of the rigid body about the axis of rotation and a circular outer wall portion adjoining the mounting portion and extending outwardly from the axis of rotation, the circular outer wall portion having an outer periphery and a first part which extends outwardly from the central wall portion and a second part which extends from the first part toward the second direction to the outer periphery, the outer wall portion having an outer surface extending 360° around the axis of rotation which curves arcuately toward the second direction to the outer periphery and serves as a skid surface as the rigid body rotates about the axis of rotation, the mounting portion having an outer surface and the outer wall portion having an inner surface for forming a plurality of cavities which open in the second direction, the plurality of cavities being separated by a plurality of ribs extending from the outer surface of the mounting portion to the inner surface of the outer wall portion, at least one cutting element and fastening means for mounting the at least one cutting element to the rigid body so that the cutting element extends outwardly from the rigid body above the skid surface for trimming the vegetation as the rigid body rotates about the axis of rotation.

23. A cutting assembly as in claim 22 wherein said at least one cutting element includes a plurality of cutting blades and wherein said fastening means includes means for mounting the cutting blades on the outer wall portion in a direction extending outwardly from said axis of rotation.

24. A cutting assembly as in claim 23 wherein each of said plurality of cutting blades comprises an elongate body having proximal and distal extremities and having upper and lower substantially planar surfaces and first and second adjoining side portions extending between the proximal and distal extremities, at least one of the first and second side portions in cross section having a decreasing thickness in a transverse direction to provide at least one inclined surface terminating in a cutting edge extending between the proximal and distal extremities, the inclined surface having longitudinally spaced apart recesses therein to form sharp teeth-like protuberances and wherein said fastening means includes means for mounting the proximal extremity of each elongate body to the body for permitting swingable movement of the cutting blades relative to the body.

* * * * *